(12) United States Patent
Tucker et al.

(10) Patent No.: US 12,015,725 B1
(45) Date of Patent: Jun. 18, 2024

(54) BLOCKCHAIN-BASED PROTOCOLS FOR METADATA LINKAGE CONTROL

(71) Applicant: Yuga Labs, Inc., Coral Gables, FL (US)

(72) Inventors: Spencer Kimball Tucker, El Dorado Hills, CA (US); Christopher Renshaw Fortier, Austin, TX (US)

(73) Assignee: Yuga Labs, Inc., Coral Gables, FL (US)

( * ) Notice: Subject to any disclaimer, the term of this patent is extended or adjusted under 35 U.S.C. 154(b) by 0 days.

(21) Appl. No.: 18/462,663

(22) Filed: Sep. 7, 2023

Related U.S. Application Data

(63) Continuation of application No. PCT/US2023/072700, filed on Aug. 23, 2023.

(51) Int. Cl.
*H04L 9/00* (2022.01)
*H04L 9/32* (2006.01)

(52) U.S. Cl.
CPC .............. *H04L 9/50* (2022.05); *H04L 9/3213* (2013.01)

(58) Field of Classification Search
CPC ................................ H04L 9/50; H04L 9/3213
See application file for complete search history.

(56) References Cited

U.S. PATENT DOCUMENTS

| | | | |
|---|---|---|---|
| 9,417,859 B2 | 8/2016 | Gounares et al. |
| 10,268,829 B2 | 4/2019 | Roets et al. |
| 10,600,009 B1 | 3/2020 | Augustine et al. |
| 10,885,021 B1 | 1/2021 | Llorca et al. |
| 10,951,409 B2 | 3/2021 | Konda et al. |
| 11,042,556 B2 | 6/2021 | Griffith et al. |
| 11,146,380 B2 | 10/2021 | Wood et al. |
| 11,157,525 B2 | 10/2021 | Wilshinsky |
| 11,212,347 B2 | 12/2021 | Zakrzewski et al. |
| 11,277,390 B2 | 3/2022 | Verzun et al. |
| 11,288,138 B1 | 3/2022 | Freilich et al. |
| 11,308,487 B1 | 4/2022 | Foster et al. |

(Continued)

FOREIGN PATENT DOCUMENTS

| | | |
|---|---|---|
| CN | 115051807 A | 9/2022 |
| CN | 111447073 B | 4/2023 |

(Continued)

OTHER PUBLICATIONS

Feist et al., "An approximate introduction to how zk-SNARKs are possible" Jan. 26, 2021, available at https://vitalik.ca/general/2021/01/26/snarks.html, 14 pages.

(Continued)

*Primary Examiner* — Taghi T Arani
*Assistant Examiner* — Blake I Narramore
(74) *Attorney, Agent, or Firm* — AEON Law, PLLC; Adam L. K. Philipp; Jonathan E. Olson

(57) ABSTRACT

Systems, methods, and computer program products are disclosed in regard to cryptographic containers or other on-chain modules. Some variants concern responding to on-chain metadata linkage disruption. Some concern confirming speculative on-chain module linkages. Some concern autonomy enhancement based on user-activity-related attributes. Some concern zero-knowledge proofs based on speculative on-chain module linkages. Some concern user-configurable privacy management or various considerations of efficiency or security.

20 Claims, 9 Drawing Sheets

(56) References Cited

U.S. PATENT DOCUMENTS

| | | |
|---|---|---|
| 11,334,883 B1 | 5/2022 | Auerbach et al. |
| 11,570,214 B2 | 1/2023 | Crabtree et al. |
| 11,599,431 B2 | 3/2023 | Wang et al. |
| 11,606,291 B2 | 3/2023 | Simu et al. |
| 11,615,399 B1 | 3/2023 | Smith et al. |
| 11,621,852 B1 | 4/2023 | Dubinsky |
| 11,663,551 B2 | 5/2023 | Stephens et al. |
| 11,665,154 B1 | 5/2023 | Smith et al. |
| 11,700,266 B2 | 7/2023 | Silverstein |
| 2014/0274078 A1 | 9/2014 | Hyde et al. |
| 2019/0034923 A1 | 1/2019 | Greco et al. |
| 2019/0095631 A1 | 3/2019 | Roets et al. |
| 2020/0364358 A1 | 11/2020 | Karia et al. |
| 2021/0119785 A1 | 4/2021 | Ben-Reuven et al. |
| 2021/0218742 A1 | 7/2021 | Cook et al. |
| 2021/0226800 A1 | 7/2021 | Cao et al. |
| 2021/0336789 A1 | 10/2021 | Chalkias et al. |
| 2021/0343101 A1 | 11/2021 | Komo et al. |
| 2021/0350357 A1 | 11/2021 | Lafontaine |
| 2021/0390196 A1 | 12/2021 | Lavine et al. |
| 2022/0141198 A1 | 5/2022 | Lundgren et al. |
| 2022/0327529 A1 | 10/2022 | Williams et al. |
| 2022/0343768 A1 | 10/2022 | Cosola |
| 2022/0355208 A1 | 11/2022 | Stephens et al. |
| 2022/0358584 A1 | 11/2022 | Sliwka et al. |
| 2022/0414626 A1 | 12/2022 | Filter et al. |
| 2023/0033192 A1 | 2/2023 | Sutherland et al. |
| 2023/0034621 A1 | 2/2023 | Pardo |
| 2023/0073545 A1* | 3/2023 | Kurian ................ G06Q 20/065 |
| 2023/0095123 A1* | 3/2023 | Fournier ............ G06F 21/6245 713/176 |
| 2023/0135256 A1* | 5/2023 | Kozlowski, III .. G06Q 20/4014 705/310 |
| 2023/0206329 A1* | 6/2023 | Cella .................... G06Q 20/405 705/37 |
| 2023/0230066 A1* | 7/2023 | Jakobsson .......... G06Q 20/3829 705/67 |
| 2023/0245103 A1* | 8/2023 | Lacavera ................. H04L 9/14 705/66 |
| 2023/0245112 A1* | 8/2023 | De Caro .............. G06Q 20/223 705/64 |

FOREIGN PATENT DOCUMENTS

| | | |
|---|---|---|
| EP | 3296913 A1 | 3/2018 |
| WO | 2023044496 A1 | 3/2023 |
| WO | 2023110551 A1 | 6/2023 |

OTHER PUBLICATIONS

"Warm Wallet Documentation", 2022, available at https://warm.xyz/documentation, 4 pages.

Sporny et al., "7.3 Identifier-Based Correlation", Verifiable Credentials Data Model v1.1, W3C Recommendation, Mar. 3, 2022, available at https://www.w3.org/TR/vc-data-model/#identifier-based-correlation.

Sporny et al., "Decentralized Identifiers (DIDs) v1.0", Core architecture, data model, and representations, W3C Recommendation, Jul. 19, 2022, available at https://www.w3.org/TR/did-core/.

Pasdar, Amirmohammad, Zhongli Dong, and Young Choon Lee. "Blockchain oracle design patterns." (2021) (Year: 2021).

International Search Report for PCT/US2023/072700 mailed on Jan. 31, 2024, 13 pages.

* cited by examiner

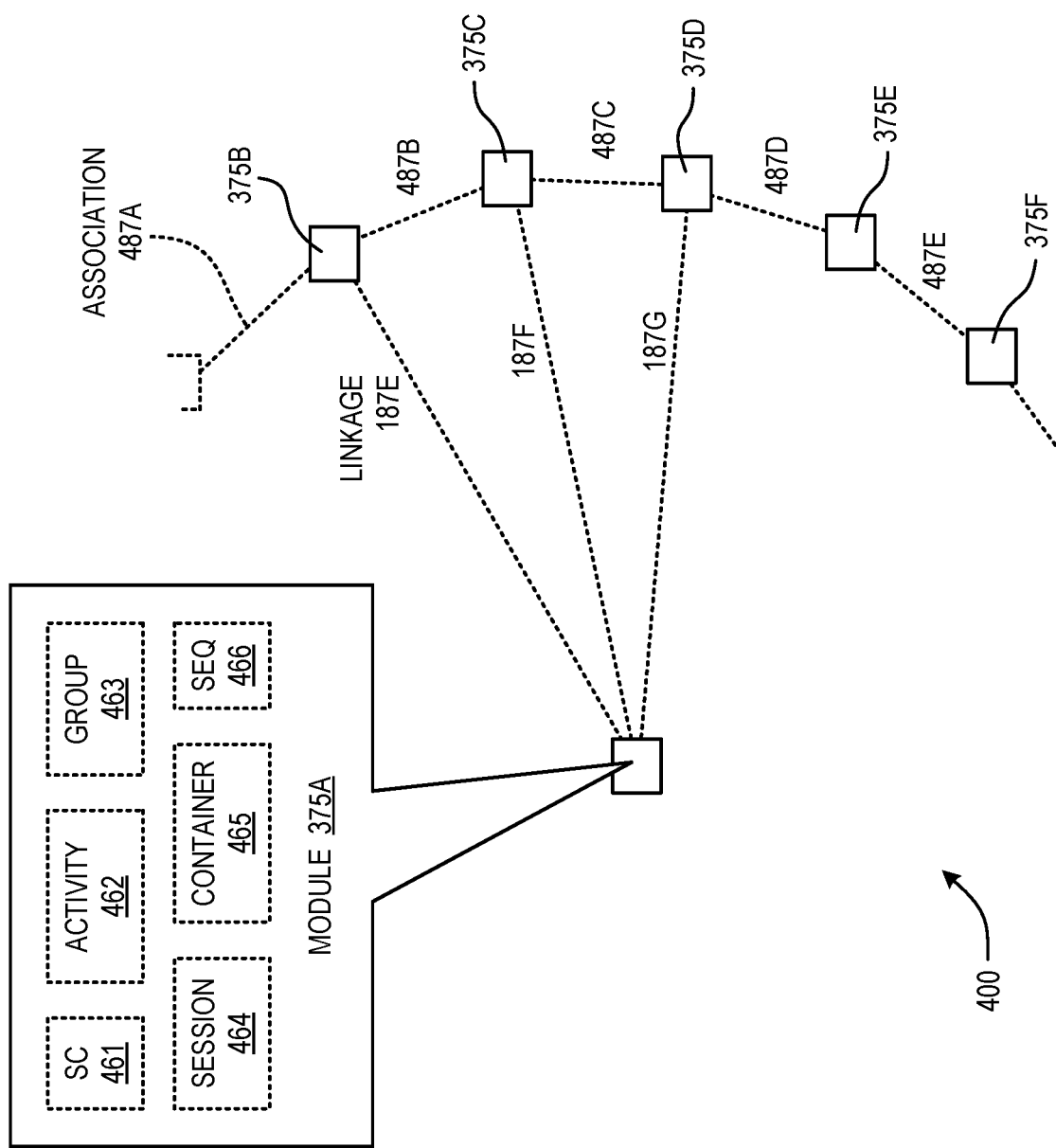

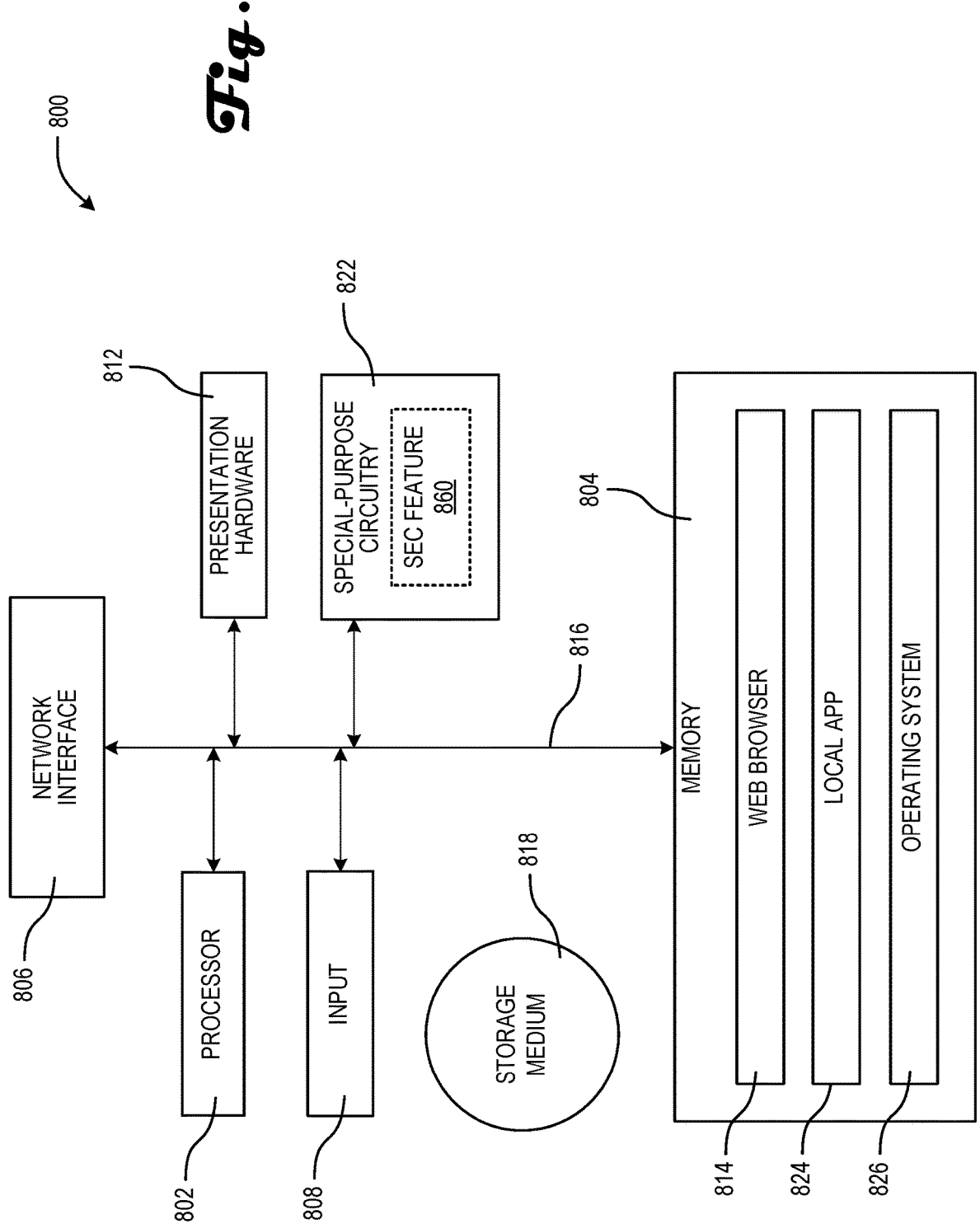

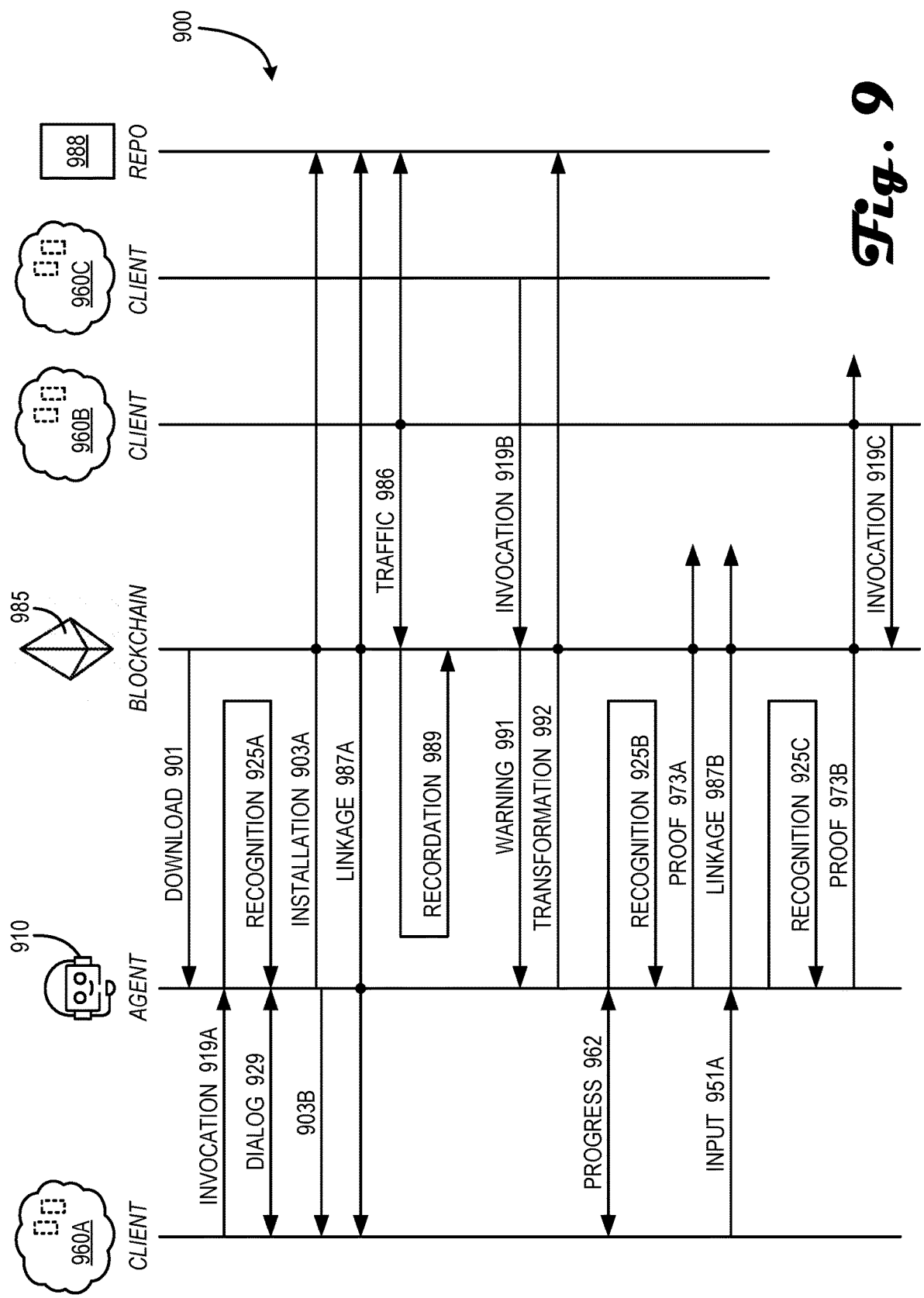

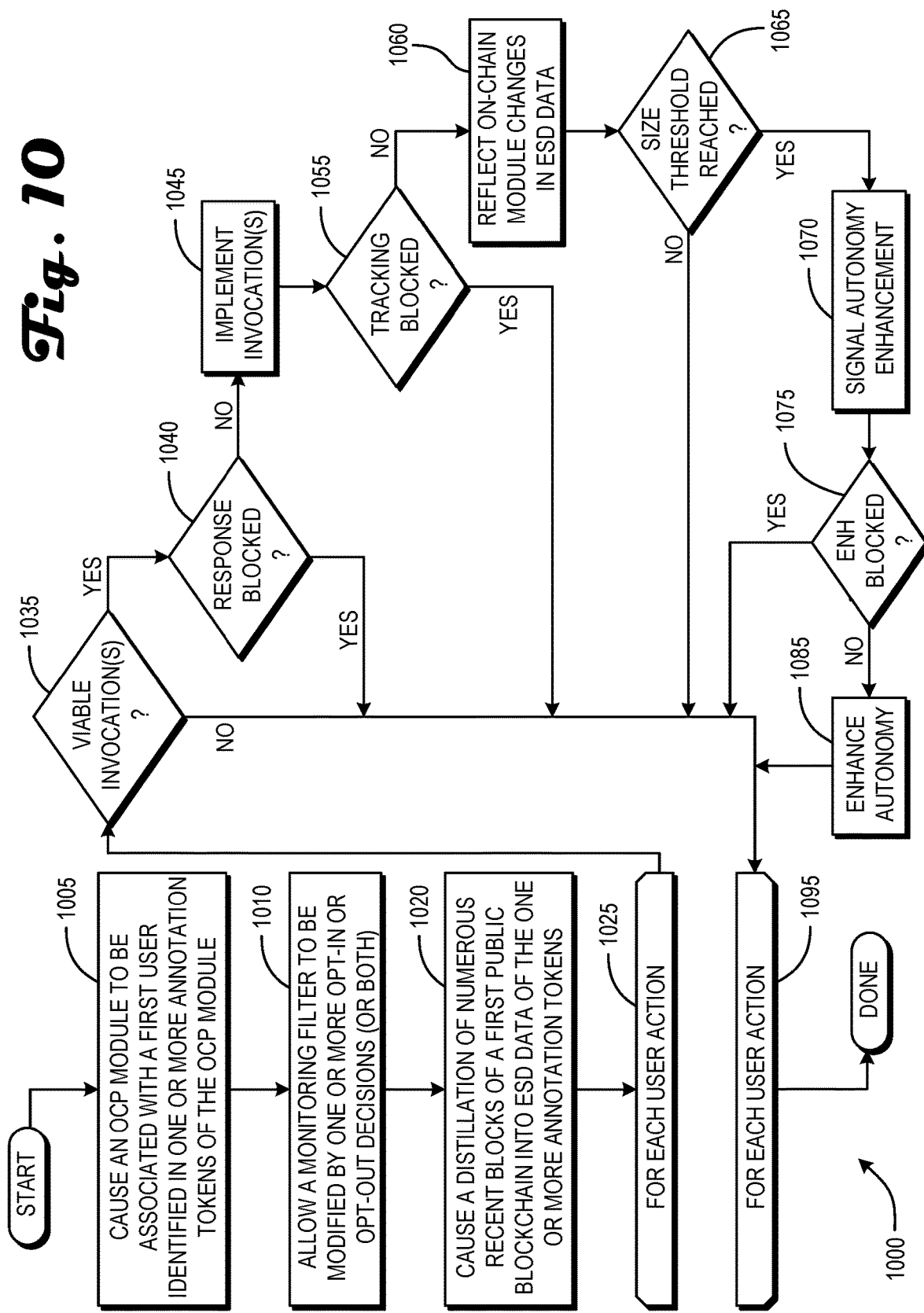

BLOCKCHAIN-BASED PROTOCOLS FOR METADATA LINKAGE CONTROL

FIELD OF USE

This disclosure relates to blockchain-related advancements including but not limited to fostering user-configurable privacy management, developing and promoting speculative on-chain linkages, wise use of machine learning and other artificial intelligence, fostering user autonomy in web3 deployments, use of zero-knowledge proofs based on succinct non-interactive arguments of knowledge (SNARKs), responding to on-chain metadata linkage disruption, or other such enhancement in blockchain-related security or accessibility.

BACKGROUND

Yuga Labs respectfully presents the following disclosure of various improvements in blockchain and complementary technologies. Useful items published by Vitalik Buterin, the World Wide Web Consortium, and other contemporary innovators are provided herewith, particularly including websites and other Information Disclosure Statement listings identified herewith.

BRIEF DESCRIPTION OF THE DRAWINGS

FIG. 4 schematically depicts linked or other related cryptographic modules in which one or more improved technologies may be incorporated.

FIG. 8 schematically depicts a client device in which one or more improved technologies may be incorporated.

FIG. 9 depicts a data flow and detailed scenario in which one or more improved technologies may be incorporated.

FIG. 10 depicts a control flow in which one or more improved technologies may be incorporated.

DETAILED DESCRIPTION

Figure 1:
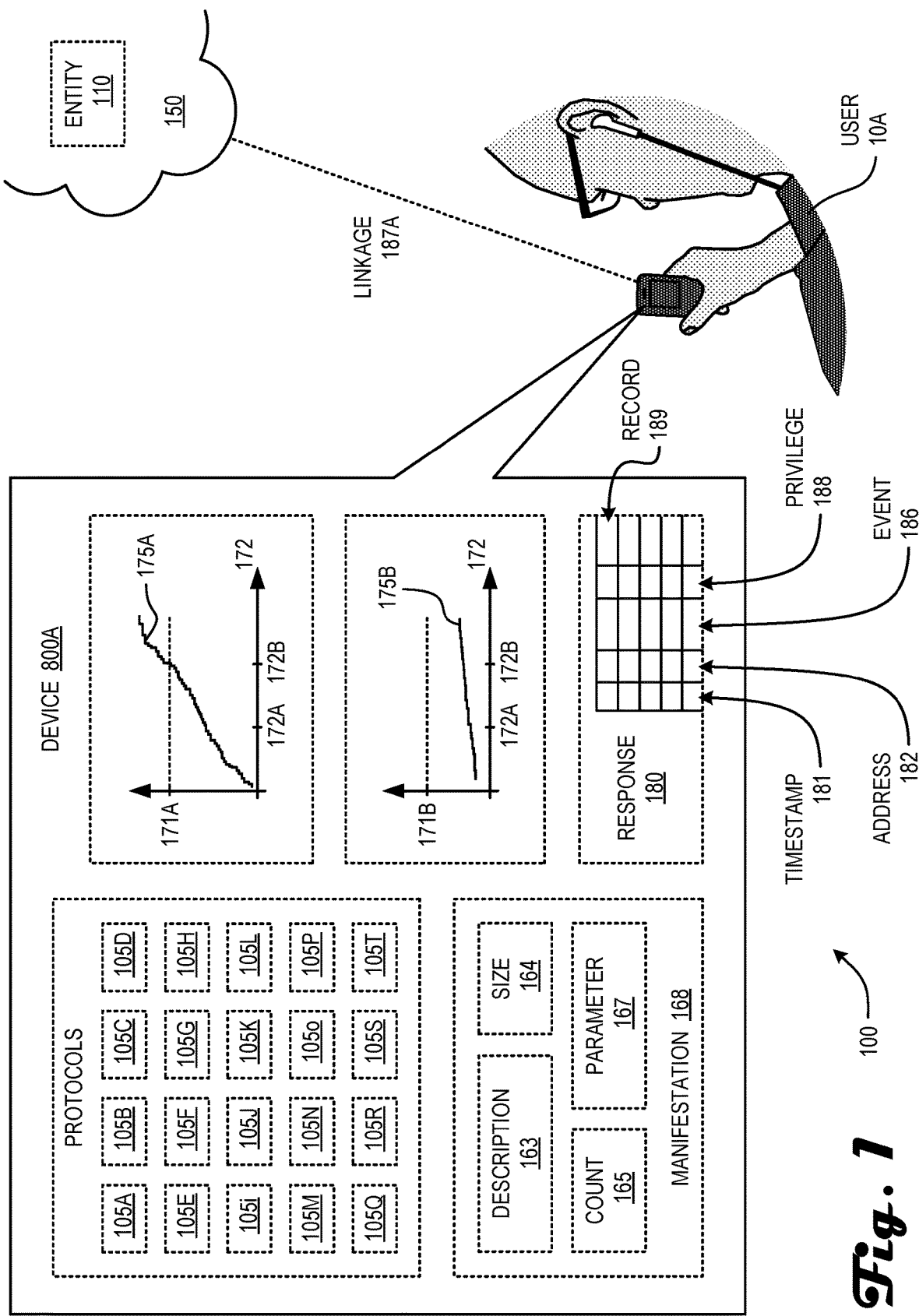
FIG. 1 schematically depicts a user of a network-connected handheld device in which one or more improved technologies may be incorporated.

The detailed description that follows is represented largely in terms of processes and symbolic representations of operations by conventional computer components, including a processor, memory storage devices for the processor, connected display devices, and input devices. Furthermore, some of these processes and operations may utilize conventional computer components in a heterogeneous distributed computing environment, including remote file servers, computer servers, and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Above," "after," "aliased," "among," "any," "application-specific," "applied," "associated," "at least," "authorized," "automatic," "autonomous," "available," "based on," "compared," "complete," "comprising," "conditional," "configured," "consecutively," "corresponding," "deployed," "digital," "directly," "distributed," "downloaded," "effective," "enhancing," "encrypted," "event-sequencing," "exceeding," "executable," "first," "for," "generated," "greater," "identified," "illustrated," "implemented," "implicit," "in lieu of," "included," "indicating," "integrated," "inversely," "invoked," "linked," "local," "manifested," "matching," "modified," "more," "near," "networked," "numerous," "obtained," "of," "on-chain," "otherwise," "particular," "partly," "pertaining," "primary," "prior," "private," "public," "received," "reclassified," "reduced," "remote," "respective," "responsive," "scheduled," "second," "signaling," "single," "size-related," "so as," "special-purpose," "specific," "speculative," "subsequent," "suitable," "suspended," "taken," "thereafter," "third," "through," "toward," "transistor-based," "translated," "triggered," "trusted," "unable," "undefined," "undue," "updated," "upon," "valid," "via," "wherein," "without," or other such descriptors herein are used in their normal yes-or-no sense, not merely as terms of degree, unless context dictates otherwise. In light of the present disclosure, those skilled in the art will understand from context what is meant by "remote" and by other such positional descriptors used herein. Likewise, they will understand what is meant by "partly based" or other such descriptions of dependent computational variables/signals. "Numerous" as used herein refers to more than two dozen. "Immediate" as used herein refers to having a duration of less than 2 seconds unless context dictates otherwise. Circuitry is "invoked" as used herein if it is called on to undergo voltage state transitions so that digital signals are transmitted therefrom or therethrough unless context dictates otherwise. Software is "invoked" as used herein if it is executed/triggered unless context dictates otherwise. One number is "on the order" of another if they differ by less than an order of magnitude (i.e., by less than a factor of ten) unless context dictates otherwise. As used herein "causing" is not limited to a proximate cause but also enabling, conjoining, or other actual causes of an event or phenomenon. "Instances" of an item may or may not be identical or similar to each other, as used herein.

Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Referring now to FIG. 1, there is shown a system 100 in which at least one user 10A interacts with network 150 via a handheld device 800A in which one or more improved technologies may be incorporated. Instances of digitally expressed protocols 105A-T described herein may reside locally in one or more such devices 800; in distributed libraries or other piecemeal implementations; across one or more networks 150, or in other contexts as further described below. In some variants one or more such devices 800 may handle one or more instances of description 163, of sizes 164, of counts 165, of parameters 167, or of other digital manifestations 168 transmitted to user 10A or via a wireless linkage 187A to one or more networks 150. Alternatively or additionally, one or more service providers or other authorized entities 110 may aggregate or otherwise handle one or more thresholds 171A-B respectively applicable at successive times 172A-B to quantified or other tracked attributes 175A-B described herein. Moreover in some contexts a structured dialog or other tracked responses 180 may (optionally) comprise one or more instances of timestamps 181, of addresses 182, of events 186, of privileges 188, or other items (e.g. as fields of records 189) described herein.

Figure 2:
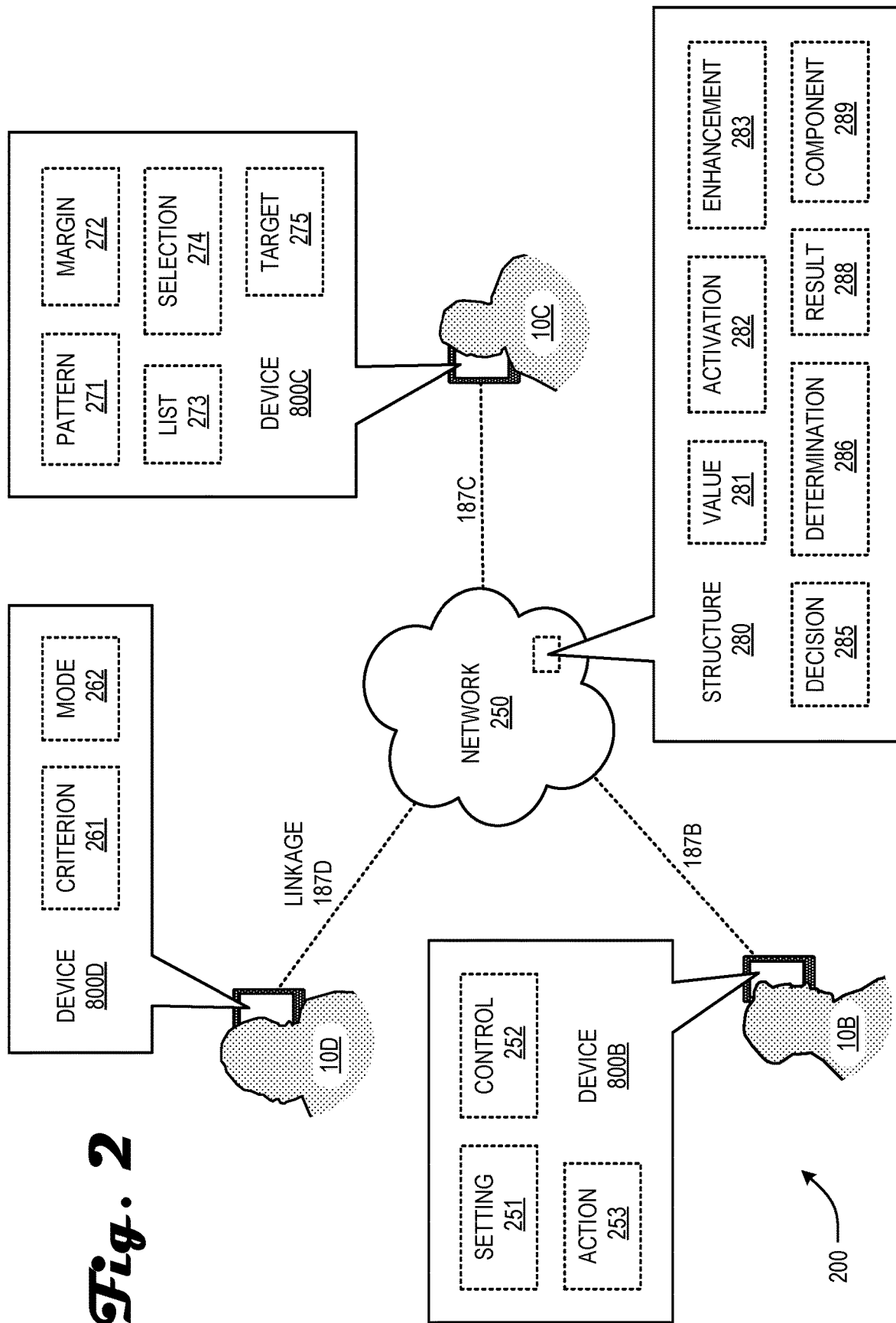
FIG. 2 schematically depicts users of other network-connected devices in which one or more improved technologies may be incorporated.

Referring now to FIG. 2, there is shown a system 200 in which one or more other users 10B-D may interact with one or more networks 150, 250 via respective linkages 187B-D. As shown an interface device 800B, for example, may handle (digital expressions of) one or more instances of settings 251, of controls 252, or of user actions 253. Likewise one or more user devices 800C may (optionally) implement one or more instances of patterns 271, of margins 272, of lists 273, of selections 274, or of targets 275. Alternatively or additionally such one or more local computing devices 800D may optionally control or otherwise apply one or more instances of criteria 261 or of modes 262 (or both) as further described below. And in some contexts one or more structures 280 resident in one or more networks 150, 250 may (optionally) feature or otherwise handle one or more instances of values 281, of activations 282, of enhancements 283, of decisions 285, of determinations 286, of results 288, or of other components 189 described herein.

Figure 3:
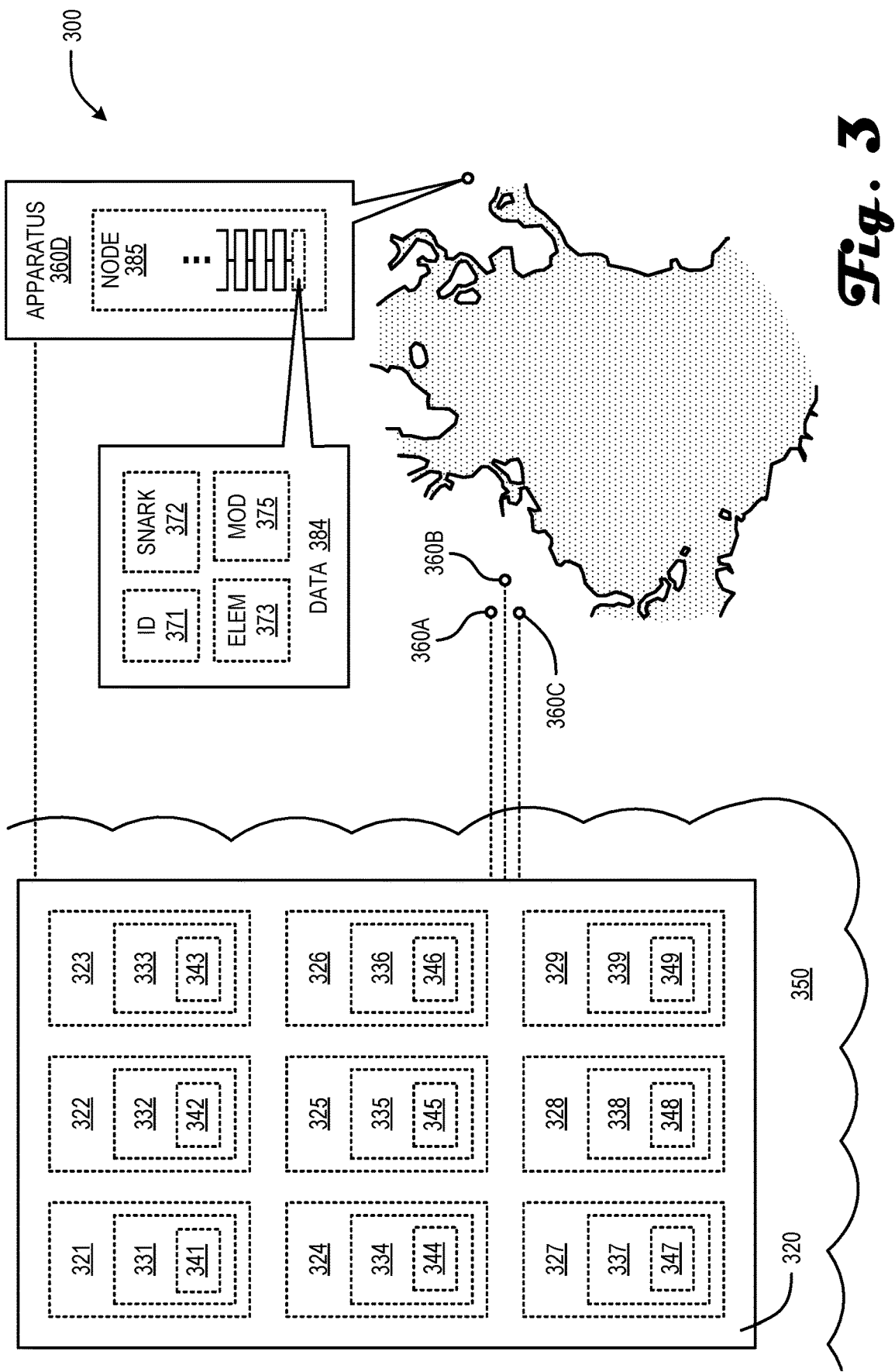
FIG. 3 schematically depicts one or more systems configured to facilitate trans-oceanic interactions in which one or more improved technologies may be incorporated.

Referring now to FIG. 3, there is shown a system 300 allows one or more apparatuses 360A-C in North America to interact with one or more apparatuses 360D in Europe via transistor-based circuitry 320 accessible by one or more networks 350 therebetween. This can occur, for example, in a context in which one or more such apparatuses 360 are operated by respective users 10, in which one or more nodes 385 of a distributed ledger reside in at least one of the apparatuses 360, and in which network 350 implements network 150 or network 250 (or both).

In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any session metadata or other informational data 384 (e.g. one or more session operating parameters 167) identified herein may be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover, many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Such circuitry 320 may comprise one or more integrated circuits (ICs), for example, optionally mounted on one or more circuit boards that implementing an event-sequencing structure as generally described in U.S. Pat. Pub. No. 2015/0094046 but configured as described herein. Transistor-based circuitry 320 may (optionally) include one or more instances of linking logic 321 configured for local processing, for example, (each) including an electrical node set 331 upon which informational data 384 is represented digitally as a corresponding voltage configuration 341. Transistor-based circuitry 320 may likewise include one or more instances of recognition logic 322 configured for local processing, for example, including an electrical node set 332 upon which informational data 384 is represented digitally as a corresponding voltage configuration 342. Transistor-based circuitry 320 may likewise include one or more instances of implementation logic 323 configured for local processing, for example, including an electrical node set 333 upon which informational data 384 is represented digitally as a corresponding voltage configuration 343. Transistor-based circuitry 320 may (optionally) likewise include one or more instances of interface logic 324 configured for triggering remote processing (using cloud-based instances of circuitry described herein, for example), including an electrical node set 334 upon which informational data 384 is represented digitally as a corresponding voltage configuration 344. Transistor-based circuitry 320 may likewise include one or more instances of invocation logic 325 configured for local processing, for example, including an electrical node set 335 upon which informational data 384 is represented digitally as a corresponding voltage configuration 345. Transistor-based circuitry 320 may likewise include one or more instances of machine learning logic 326 configured for local processing, for example, including an electrical node set 336 upon which informational data 384 is represented digitally as a corresponding voltage configuration 346. Transistor-based circuitry 320 may likewise include one or more instances of tracking logic 327 configured for local processing, for example, including an electrical node set 337 upon which informational data 384 is represented digitally as a corresponding voltage configuration 347. Transistor-based circuitry 320 may likewise include one or more instances of control logic 328 configured for implementing, for example, including an electrical node set 338 upon which informational data 384 is represented digitally as a corresponding voltage configuration 348. Transistor-based circuitry 320 may likewise include one or more instances of distillation logic 329 configured for local processing, for example, including an electrical node set 339 upon which informational data 384 is represented digitally as a corresponding voltage configuration 349.

In some variants, for example, a server or other apparatus 360 in North America may manifest an instance of a signal path between an originating environment, a processing environment, and a destination environment. Some such paths may pass through multiple computing or other interstitial environments of which some may provide one or more rules, parameters 167, or other aspects of parametric protocols 105C thereof to implement one or more hash functions or other security features thereof, such as with a judicious use of private key encryption. In some variants, cloud implementation circuitry 320 or a local apparatus 360 (or a combination thereof) may maintain metadata signaling one or more instances of entity identifiers, of succinct non-interactive arguments of knowledge (SNARKs) 372, or other parameters used in generating proofs described herein, of elements 373 or modules 375 protected from tampering, or of other informational data 384, 584 as further described below.

As used herein a "metadata linkage" among items "A" and "B" may comprise a metadata component in item "A" that validates item "B" or a metadata component used by item "B" that predictively identifies item "A" (or both). Alternatively or additionally, such a linkage among items "A-C" may comprise a metadata component in item "C" configured to block an attack upon item "A" or a metadata component in item "B" configured to allow a selective update to item "C" (or both). Other examples will be evident in light of teachings herein.

An "association" exists among items "A" and "B" as described herein if (1) they are "connected" as described herein or have a direct linkage therebetween, (2) they are both accessible by a private key or equivalent security parameter in common, (3) they are provably accessible by the same party, or (4) they are both selectively identified by one or more match criteria 261 of a search protocol 105S invoked by an information-seeking user 10D. An association protocol 105Q may establish an intermodular "association" by applying one or more inclusive or other selection parameters 167 provided by one or more users 10 (e.g. pertaining to event counts 165 or other attributes 175). An association protocol 105Q may also cause a manifestation 168 (e.g. a hash function) of such associations in an annotation token or repository as further described below. And in some variants such association may be distilled into speculative or other linkages among the modules 375 thereof, as further described below. See FIGS. 9-10.

Also as used herein an instance of an artificial intelligence (AI) prompt list, smart contract, app, subroutine, or other device-executable instruction sequence is said to be "on-chain" if one or more instructions therein are configured to modify a public blockchain or are protected from tampering via a hash function of a public blockchain (or both). See FIGS. 4-6. Conversely an item is "off-chain" if it is not stored within a public blockchain, is not protected from tampering via an on-chain hash function, and does not include any executable instructions configured to modify a public blockchain.

A "repository" as used herein may include a collection of non-fungible tokens, event-descriptive records, predictions, playable or user-created files, measurements, instruction sequences, or other distinct expressions. It may also include a library of data or software objects, an inventory of files, a storage allocation configured to aggregate such a library or inventory, a cloud storage device, or combination of such resources. As used herein any portfolio, activity, token, container, subset, profile, instruction, or other such discrete informational expression is said to be "on-chain" if any element of the expression is stored within a public blockchain or is protected from tampering via a hash function of a public blockchain (or both). A repository of discrete informational expressions is "on-chain" if most or all of the expressions in it are on-chain.

As used herein a digital module other than a block of a distributed ledger is "token-associated" if any token transfers or mintings have identified it (e.g. as a token source, smart contract, or destination). As used herein first and second token-associated modules (TAMs) are "directly connected" in a pairing only if at least one of them associates to the other with a pointer or other metadata linkage. First and second TAMs are "indirectly connected" if both are directly connected to the same TAM or to an unbroken cluster or chain of pairings of directly connected TAMs.

As used herein a "disruption" of a metadata linkage may comprise any interference, discovered corruption or other flaw, obfuscation, interruption, aspersion, or other relational change that delays, discredits, or otherwise impairs a suitability of one or more response protocols 105B for restoring or otherwise programmatically improving a performance of the linkage. As used herein a linkage's performance is "improved" if a tracked attribute 175 that pertains to the linkage changes in a direction that one skilled in the art would consider favorable (e.g. having a purpose or effect of reducing a risk 583 or otherwise at least sometimes improving a protocol result 288) in light of teaching herein.

As used herein a token-associated module (TAM) transformation causes a TAM to be "less controlled" by a service provider or if the transformation causes the service provider to become unable to authorize or perform at least one protocol (e.g. a "freeze container" protocol or "monitor transfer invocations" protocol), even if the first service provider simultaneously becomes able to authorize or perform one or more new protocols pursuant to the transformation. (For example such a new protocol might include a multi-party compute (MPC) partner enrollment protocol 105M.)

As used herein a TAM or its users become "more autonomous" if the TAM is "less controlled" by a TAM creator or other custodian or if one or more users of the TAM thereby become able to take part in a new service protocol (or both) pertaining to the TAM. (For example such "becoming able" might include a user gaining access to a "self-managed" module recovery protocol 105E or might include a new co-user being selected by the user.)

As used herein a token-associated or other on-chain module is "primary" if it is directly identified to its user (e.g. in association with a user-viewed mnemonic or address) or has a function or role that is configured to be directly invoked by its user (e.g. via a menu selection or other control activation). As used herein an actual or other association is "speculative" if it passes one or more conjectural qualifying criteria signaling that the (linkage or other) association may exist or probably exists but has not been confirmed.

Referring now to FIG. 4, there is shown a digital context 400 (e.g. in an aliased or other protected address space) featuring digital modules 375A-F in which one or more improved technologies may be incorporated. The modules 375 may comprise one or more instances of smart contracts 461, of activities 462, of groups 463, of sessions 464, of containers 465, of sequences 466, or combinations thereof. Such a context 400 comprises at most a single unbroken subset of on-chain or token-associated modules 375 on a public blockchain. Module 375A as shown, for example, has a direct linkage 187E to module 375B, a direct linkage 187F to module 375C, and a direct linkage 187G to module 375D respectively. Module 375B has a direct association 487B to module 375C, a direct association 487 (comprising linkage 187E), and another direct association 487A to another module 375. Module 375D has a direct association 487C to module 375C, a direct association 487 (comprising linkage 187G), and another direct association 487C to module 375E. Module 375F is only indirectly coupled to modules 375A and 375D, via associations 487D-E and module 375E. In some variants, module 375A is a "hub" with numerous (i.e. more than 24) additional direct associations 487 with other token-associated modules 375 as "spokes" that are not shown. Alternatively or additionally, in some variants a long unbroken module chain (i.e. more than 200 modules end-to-end) include modules 375A-F as shown that are consecutively associated.

Figure 5:
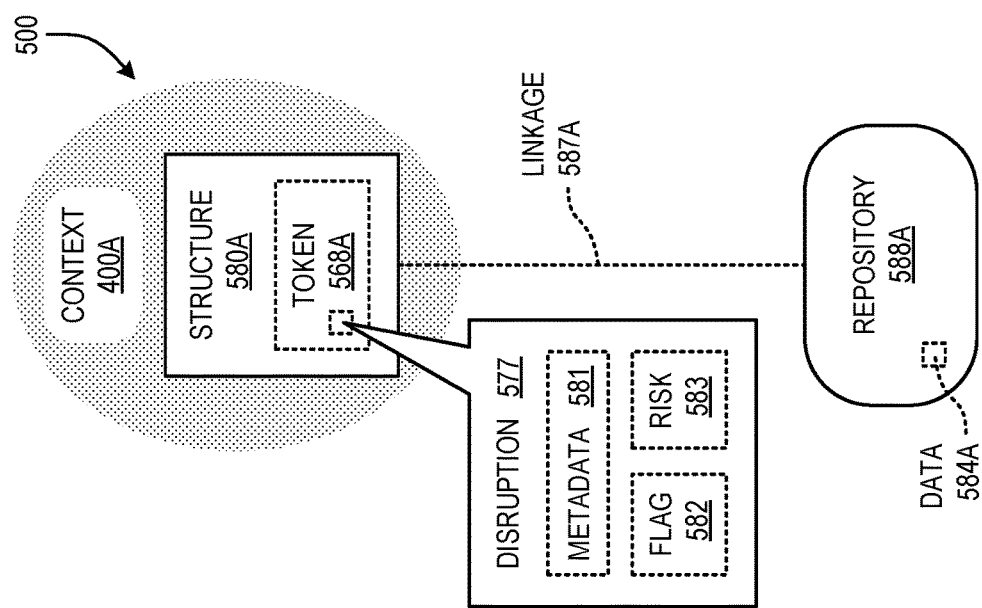
FIG. 5 schematically depicts a module deployment having at least one linkage to off-chain resources that has become unreliable or otherwise disrupted, in which one or more improved technologies may be incorporated.

Referring now to FIG. 5, there is shown a first deployment 500 in which a first structure 580A (e.g. a network-accessible token-associated module 375 or other container 465) resides in a context 400A that is at least partly protected from tampering, such as by one or more hash functions of a public blockchain. One or more digital tokens 568A are associated with a linkage 187A, 587A with at least some data 584A in a repository 588A that is "external" insofar that it is not within first structure 580A and not resident in a public blockchain. As shown at least one of the tokens 568A or the linkage 187A, 587A is deemed unready, unreliable, or otherwise affected by (at least) a first disruption 577. This can occur, for example, in a context in which metadata 581 (e.g. an alarm flag 582 or other manifestation of risk) signals that one or more response protocols 105B should be triggered; in which an "unresolved" risk 583 of the first disruption 577 is initially recorded on-chain; in which a first response protocol 105B triggers programmatic evaluation or other appropriate securement; and in which a "resolved" risk 583 of the first disruption 577 is later recorded on-chain. See FIG. 6.

Figure 6:
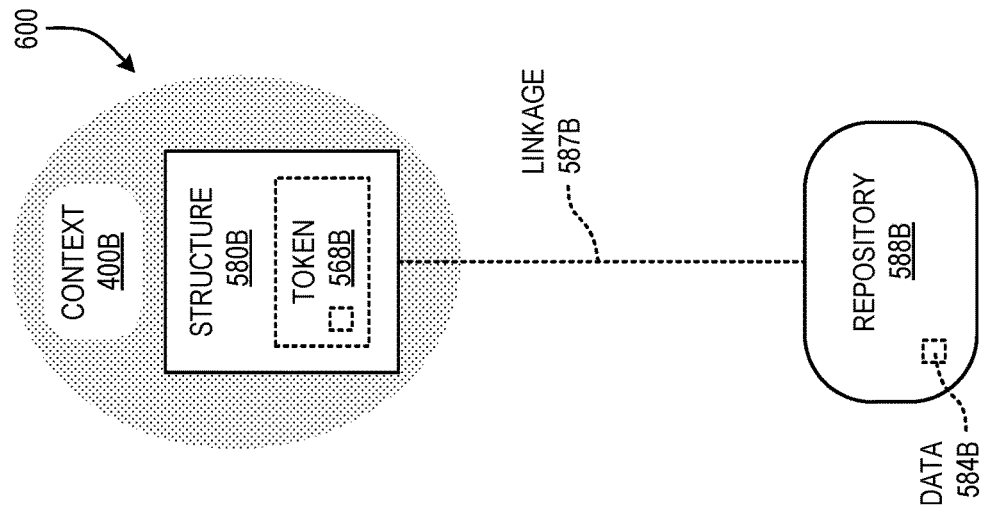
FIG. 6 schematically depicts a deployment like that of FIG. 5 but in which the first disruption is resolved, in which one or more improved technologies may be incorporated.

Referring now to FIG. 6, there is shown a second deployment 600. As shown (at least) the first disruption 577 has been resolved, such as by a new minting protocol 105R or other restorative migration. As shown a modified structure 580B resides in a new or improved context 400B that is at least partly protected from tampering, such as by one or more hash functions of a public blockchain. In some variants one or more digital tokens 568B are likewise associated with an improved token 568B or with an improved linkage 587B to corresponding data 584B of one or more repositories 588B, one corresponding to the above-described (removed or otherwise) resolved disruption 577. This can occur, for example, in a context in which metadata 581 of such token(s) 568B signals that a disruptive risk 583 has been mitigated or that the one or more response protocols 105B have been invoked (or both).

Referring again to some or all of FIGS. 1-6, a system 100, 200, 300 and method described herein may trigger a minting of one or more annotation tokens 568 that manifest a first metadata linkage 187A, 587A in a first deployment 500 and with one or more on-chain or other event-sequence-descriptive (ESD) data repositories 588. The system and method may also respond to input from someone (e.g. an entity 110 who authorized the minting) by responding to a disruption 577 in the first deployment 500 by (re-establishing or otherwise) establishing a metadata linkage 587B in a second deployment 600. See FIGS. 5, 6, and 9.

As used herein a user-identifying NFT or other "annotation" structure 280 may include one that is configured to contain or connect to one or more manifestations 168 (e.g. hash functions or other distillations) of annotation data. Such structures 280 may include one or more instances of values 281, of activations 282, of enhancements 283, of user decisions 285, of computed determinations 286, of computed results 288, or of components 289 or distillations thereof (e.g. a pointer or hash function) as further described below.

An "annotation token" as used herein includes a cryptographic token (A) that differs from a conventionally configured ERC-721 ("Ethereum Request for Comment") token and (B) that contains or links to one or more instances of comments, user action records, decisions or other user inputs, natural language explanation, user-provided criteria, or other such tracked parameters 167 or manifestations 168 pertaining to a user's actions as described herein. An "annotation token" likewise includes a cryptographic token having a designated purpose of containing or linking to such manifestations later, whether or not it has been encrypted or has additional purposes. In some contexts this is a primary mechanism for establishing or otherwise facilitating a metadata linkage as described herein.

Alternatively or additionally a system 100, 200, 300 and method described herein may mint or otherwise deploy one or more annotation tokens 568 that establish a first linkage 187A, 587A with a first event-sequence-descriptive (ESD) data 384, 584 or repository 588 thereof based upon a first action 253 taken by a first user 10A. The system and method may also obtain a "speculative" second linkage 187, 587 with another ESD data repository 588 based upon a second action 253 (tenuously or otherwise) indicated in association with the first user 10A. This can occur, for example, in a context in which the "first" and "second" ESD data 384, 584 might or might not have an actual linkage to the same user 10; in which at least one of these unconfirmed linkages is thereby "speculative"; and in which "speculative" linkages are actionable by one or more response protocols 105B. The system and method may also provide a first selective demonstration (e.g. a zero-knowledge proof) pertaining to the first or second action 253 partly based on the first linkage 187A, 587A with the first ESD data repository 588 and partly based on the speculative second linkage 187, 587 with the second ESD data 384, 584 or repository 588 thereof.

Such a response protocol 105B may include asking the suspected user-in-common to confirm a speculative linkage (1) by using a private key of an on-chain target module 375 with which they are tenuously associated or (2) by providing one or more categorical or probabilistic parameters 167 that describe relative confidence in one or more speculative linkages 187, 587 to an information-seeking user 10D (or both). This can occur, for example, in a context in which the information-seeking user 10D would otherwise have no information on which to decide who to contact in regard to the target module 375 of the described speculative linkage 587.

Alternatively or additionally a system 100, 200, 300 and method described herein may cause a first OCP module 375A to be associated with a first user 10A and with one or more on-chain connected modules 375 that are related to the first OCP module 375A. This can occur, for example, in a context in which the first OCP module 375A is directly associated with event-sequence-descriptive (ESD) data 384, 584 describing one or more token transfer events 186 and in which the ESD data 384, 584 has at least one scalar size-indicative attribute 175A characterizing a rate or level of growth of at least an element 373, module 375, or repository 588 of the ESD data 384, 584 and in which the size-indicative attribute 175A may signal one or more profile, token, or other manifestation sizes 164. The attribute 175A may likewise include one or more instances of event counts 165 or a polynomial or other arithmetic combination of these (indicators of) quantified sizes 164. Such a profile manifestation 168 may include static or other descriptions 163 or other parameters 167 of metadata 581, for example, not all of which might grow.

The system and method may also cause the scalar size-indicative attribute 175A or the corresponding ESD data 384, 584 (or both) to grow numerous times as the first OCP module 375A records descriptions 366 of numerous additional events 186. By a repeated application of at least a first programmatic criterion 261 evaluating an aggregation of the ESD data 384, 584 (e.g. one or more de facto thresholds 171A-B applied to the scalar size-indicative attribute 175A crossing or otherwise reaching a first threshold 306A by indicating to the first user 10A an incremental or other autonomy-enhancing transformation 395 away from the authorized entity 110; and In some variants such systems and methods may respond to (a gesture or other manifestation 368 of) an autonomy-indicative user decision 185 by conditionally facilitating a more autonomous cryptographic module deployment 600. This destination may be "more autonomous" insofar that one or more privileges 188 that existed in a corresponding prior deployment 500 (e.g. the authorized entity 110 having been able to access a password-protected component of one or more annotation tokens 568) become unavailable to the authorized entity 110.

Alternatively or additionally such systems and methods may obtain a speculative first linkage 187E (at least partly) based upon a count 165 of token transfer events 186 in which a nonzero amount of cryptographic tokens 568 (arrived in or otherwise) came to reside in one or more modules 375 linked to the first module 375A.

Figure 7:
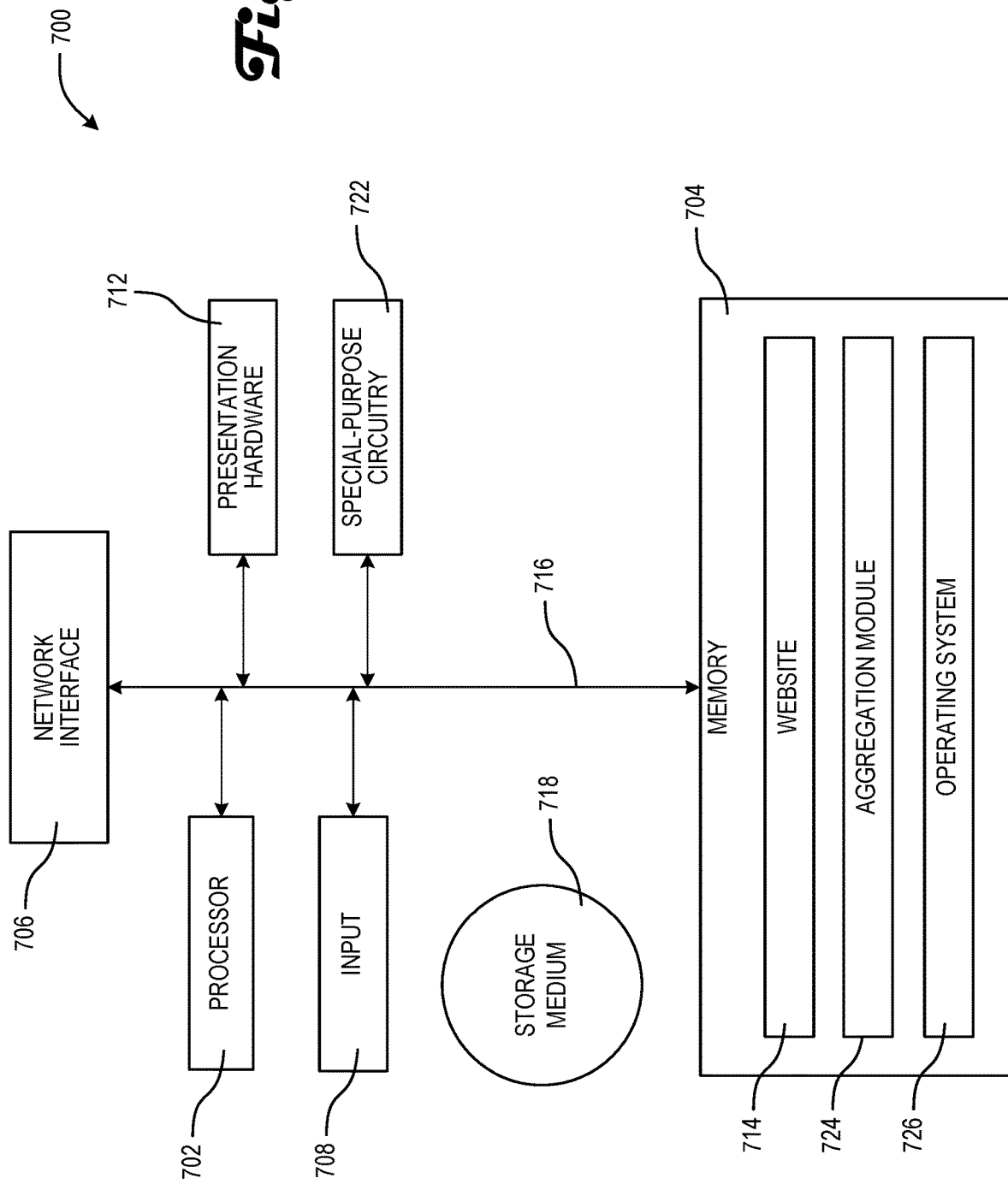
FIG. 7 schematically depicts a server in which one or more improved technologies may be incorporated.

Referring now to FIG. 7, there is shown a server 700 in which one or more technologies may be implemented. Server 700 may include one or more instances of processors 702, of memories 704, user inputs 708, and of (speakers or other) presentation hardware 712 all interconnected along with the network interface 706 via a bus 716. One or more network interfaces 706 allow server 700 to connect via the Internet or other networks 150). Memory 704 generally comprises a random access memory ("RAM"), a read only memory ("ROM"), and a permanent mass storage device, such as a disk drive.

Memory 704 may contain one or more instances of websites 714, of aggregation modules 724, of operating systems 726, or of token preference affinity services or other such scoring modules that facilitate modeling the preferences of an information-seeking user 10D or other proof recipient. These and other software components may be loaded from a non-transitory computer readable storage medium 718 into memory 704 of the server 700 using a drive mechanism (not shown) associated with a non-transitory computer readable storage medium 718, such as a floppy disc, tape, DVD/CD-ROM drive, flash card, memory card, or the like. In some embodiments, software or other digital components may be loaded via the network interface 706, rather than via a computer readable storage medium 718. Special-purpose circuitry 722 may, in some variants, include some or all of the event-sequencing logic described herein. In some embodiments server 700 may include many more components than those shown in FIG. 7, but it is not necessary that all conventional components of a server be shown in order to disclose an illustrative embodiment.

Referring now to FIG. 8, there is shown a client device 800 in which one or more technologies may be implemented. Client device 800 may include one or more instances of processors 802, of memories 804, user inputs 808, and of (speakers or other) presentation hardware 812 all interconnected along with the network interface 806 via a bus 816. One or more network interfaces 806 allow device 800 to connect via the Internet or other networks 150). Memory 804 generally comprises a random-access memory ("RAM"), a read only memory ("ROM"), and a permanent mass storage device, such as a disk drive.

Memory 804 may contain one or more instances of web browsers 814, of other local apps 824, of operating systems 826, or of other modules that facilitate operations described herein. These and other software components may be loaded from a non-transitory computer readable storage medium 818 into memory 804 of the client device 800 using a drive mechanism (not shown) associated with a non-transitory computer readable storage medium 818, such as a floppy disc, tape, DVD/CD-ROM drive, flash card, memory card, or the like. In some embodiments, software or other digital components may be loaded via the network interface 806, rather than via a computer readable storage medium 818. Special-purpose circuitry 822 (implementing a security feature 860, e.g.) may, in some variants, include some or all of the event-sequencing logic described herein. In some embodiments client device 800 may include many more components than those shown in FIG. 8, but it is not necessary that all conventional components of a mobile device be shown in order to disclose an illustrative embodiment.

Further in regard to the above referenced FIGS. 1-8, FIG. 9 depicts a data flow 900 and detailed scenario in which one or more clients 960A-C interact with one or more agents 910, blockchains 985, or repositories 988. As will be recognized by those having ordinary skill in the art, not all events of information management are illustrated in FIG. 9. Rather, for clarity, only those events reasonably relevant to describing the blockchain-related computing interaction aspects of data flow 900 are shown and described. Those having ordinary skill in the art will also recognize the present embodiment is merely one exemplary embodiment and that variations on the present embodiment may be made without departing from the scope of the broader inventive concept set forth in the clauses and claims below.

As shown an artificial agent 910 or other trusted entity 110 implements an incremental or other download 901 from a public blockchain 985 (e.g. into one or more local or other efficiently accessed memories 804 or other data handling media 818 of agent 910). One or more users 10 or other clients 960A visits a website 714 or otherwise transmits one or more invocations 919A to agent 910 (e.g. as response 180 to clients' actions 253 or other detectable events 186). Agent 910 implements processing and recognition 925A of data patterns or other digital phenomena found in download 901 based on the one or more task requests or other invocations 919A. This may yield identification 371 of on-chain modules 375 associated with client 960A, which are then characterized further, for example, via iterations of structured dialogues 929 with one or more clients 960 and data processing using operating parameters described herein).

Agent 910 thereafter implements at least one installation 903A of one or more tokens 568 on blockchain 985 in association with on-chain or other metadata 581 at least in repository 988. Agent 910 likewise facilitates installation 903B or other setup of appropriate interface in client 960A (e.g. via a browser 814 or web app or local app 824). One or more linkages 587A, 987A are thereby established with agent 910 and one or more instance of clients 960, of blockchains 985, or of repositories 988 or particular pairings thereof as further described below.

Thereafter as further described below various observable traffic 986 among one or more clients 960A-C or blockchains 985 may be extracted or otherwise tracked in respective repositories 988 according to one or more on-chain structures 280 established by the above-described protocols 105, installations 903, or linkages 587, 987. In some contexts such traffic 986 corresponds to one or more on-chain recordations 989 such as identification 371, SNARKs 372, or other on-chain metadata 581 described herein.

In some contexts an invocation 919B (e.g. a malicious or other unauthorized request to modify one or more annotation tokens 568) may arrive, such as from an unauthorized entity (e.g. client 960C) or exceeding a given entity's authority. As a response 180 to (a recognition of) this or various other recognized disruptions 577 described herein, a warning 991 to an agent 910 or other custodial entity 110 acting on behalf of a client 960A may occur. In some contexts this may trigger a migration or other protective transformation 992, optionally in lieu of notifying the unauthorized entity whose invocation 919B initiated the disruption 577.

Meanwhile progress 962 or other traced user activity 462 (e.g. along a prescribed development path) may likewise trigger one or more actionable recognitions 925B as described herein. In an on-chain context 400 of numerous actions 253 by a first client 960A who uses a specific module 375A, for example, a distillation module 329 may develop a significant speculative basis (e.g. corresponding to a likelihood exceeding 10%) for gleaning that another specific module 375F may also be owned by the same client 960A. Likewise some observed actions 253 of a specific user 10A may signaling a likelihood of membership in or other affiliation with client 960 even before such linkages are proven. A recognition of such speculative linkages 187 may be suitable for triggering a notification to other clients 960B in some instances, particularly when both clients 960A-B have not opted out of (or have opted into) participation in a structured interaction along these lines. In some privacy protection protocols 105J described herein, inchoate or other partial introductions are made possible so as to prevent any doxxing or other unwanted loss of privacy. This may include a proof 973A that an unknown party who apparently controls a given container 465 or other on-chain module 375F is reachable without revealing any unnecessary information about that unknown party to the recipient client 960B. Such a proof 973A may include a likelihood or other quantified expression of risk 583, moreover, when the association 487 between the unknown party and a recipient-designated module 375F of interest is not yet a confirmed linkage 187. See FIG. 4.

When a suitable context of progress 962 advances further, moreover, the unknown party may include additional input 951A such as an opt-in decision 285, linkage 987B to a more expedient contact mode, or certification(s) of control over other on-chain modules 375. In some contexts this may allow a proof 973B of confirmed control over the recipient recipient-designated module 375F, optionally while still preventing any unnecessary information about that unknown party being provided to recipient client 960B. But some such clients 960B will nonetheless proceed with one or more invocations 919C of transfers, notifications, smart contract sequences 466 to or from the unknown party (e.g. based on what is known about the given container 465 or other on-chain module 375F).

Referring again to one or more of FIGS. 1-9, some systems 100, 200, 300 and methods described herein may cause a first on-chain module 375A to be associated as a tentative first linkage 187E with (at least) a second on-chain module 375B partly based upon an action 253 by a user 10A pertaining to the first on-chain module 375A and partly based upon an action 253 by the same user 10A pertaining to the second module 375B. A tentative or "speculative" second linkage 187 is likewise obtained among several other on-chain modules 375 including a third module 375D and a fourth module 375E. Such a system and method may allow or otherwise cause the tentative first linkage 187E to be converted into a confirmed first linkage 187E among the same user 10A, the first on-chain module 375A, and the second on-chain module 375B by giving another (user 10 or other) entity 960 access to a zero-knowledge proof that confirms that the first and second on-chain modules 375A-B are commonly controlled without revealing meaningful identification 371 of who controls them. This can occur, for example, in a context in which common control over on-chain modules 375A-B or their contents could not otherwise be proven in a truly pseudonymous interaction sequence 466 and in which metadata 581 gathered about one or more users 10 could not otherwise instill confidence in safely establishing salient attributes of an online entity.

Also with regard to some variants a system 100, 200, 300 and method herein may obtain an inchoate or other speculative metadata linkage 187, 587 with a corresponding ESD data repository 588, 988 based upon a first user action 253 relating to (at least) a first user 10A and to the corresponding ESD data repository 588, 988 (e.g. using the repository 588, 988). The system and method may also transmit or otherwise allow access to a mathematical demonstration (e.g. a zero-knowledge proof 973) pertaining to (at least) the first user action 253 based on (any kind of) a second metadata linkage 187, 587 thereof (anonymously or otherwise) such that the demonstration protects the first user 10A (e.g. from data misappropriation).

Also with regard to some variants a system 100, 200, 300 and method herein may obtain a first linkage 187, 587, 987 or other association 487 between a first on-chain primary (OCP) module 375A and a first user 10A. In some variants one or more annotation tokens 568 are deployed so that the first linkage 187, 587 qualifies as a first "metadata linkage" 187A, 587A in a first deployment 500 and with an event-sequence-descriptive (ESD) data repository 588, 988. The system and method may also respond to a first disruption 577 of the first metadata linkage 187A, 587A by establishing a replacement metadata linkage 587B in a re-deployment 600 also associated with the one or more ESD data repositories 588, 988.

Also with regard to some variants a system 100, 200, 300 and method herein may proximately or otherwise cause a first on-chain first module 375A at least partly controlled by a first authorized entity 110 to be associated with a first user 10A and one or more other modules 375 that are associated with the first on-chain first module 375A. The system and method may adapt or otherwise cause a first user-descriptive filtering (UDF) protocol 105L to be applied partly based on one or more actions 253 by the first user 10A signaling an opt-in monitoring decision 285 and partly based on one or more actions 253 by the first user 10A signaling an opt-out monitoring decision 285. The system and method may also cause the first on-chain first module 375A to implement the UDF protocol 105L by configuring a metadata linkage 187, 587 among the first user 10A and one or more repositories 588, 988 as described herein.

FIG. 10 depicts a control flow in which one or more improved technologies may be incorporated. As will be recognized by those having ordinary skill in the art, not all events of information management are illustrated in FIG. 10. Rather, for clarity, only those events reasonably relevant to describing the blockchain-related computing interaction aspects of control flow 1000 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 1005 describes causing a on-chain primary (OCP) module to be associated with a first user 10A identified in one or more annotation tokens 568 of the OCP module 375A (e.g. an instance of linking logic 321 causing an OCP module 375A to be associated with a first user 10A identified in one or more annotation tokens 568 of the OCP module 375A). Flow then passes to operation 1010.

Operation 1010 describes allowing a monitoring filter to be modified by one or more opt-in or opt-out decisions (e.g. an instance of recognition logic 323 allowing a monitoring filter to be modified by one or more opt-in or opt-out decisions 285). Flow then passes to operation 1020.

Operation 1020 describes causing a distillation of numerous recent blocks of a first public blockchain into event-sequence-descriptive (ESD) data of the one or more annotation tokens (e.g. an instance of invocation logic 325 causing a distillation of at least some of the recent blocks of a first public blockchain 985 into ESD data 384, 584 of the one or more annotation tokens 568). This can occur, for example, in a context in which remote distillation logic 329 is triggered by local invocation logic 325. Flow then passes to operation 1025.

Operation 1025 begins a loop comprising one or more iterations of operations responsive to each user action (e.g. an instance of control logic 328 passing control to operation 1035 for each triggering user action 253 and otherwise allowing flow to pass to operation 1095). This can occur, for example, in a context in which the current user 253 comprises a task completion, a transaction, a query response, a value modification, a control activation, a recognized utterance or gesture, or any other user action 253 that is of a detectable type. Flow then passes to operation 1035.

Operation 1035 describes obtaining a determination whether or not a latest user action established one or more viable invocations (e.g. an instance of recognition logic 322 and control logic 328 jointly obtaining a determination 286 whether or not the last user action 253 established any invocations 919 as described herein). This can occur, for example, in a context in which invocations are implemented iteratively (e.g. successively in an execution loop). If the user action 253 signaled or otherwise triggered any viable invocation then flow then passes to operation 1040, otherwise it passes to operation 1095.

Operation 1040 describes obtaining a determination whether or not a user-indicative operating parameter blocks a response that would otherwise have resulted from the determination that the one or more invocations are viable (e.g. another instance of control logic 328 generating or otherwise obtaining a determination 286 whether or not a security protocol 105P blocks a particular response 180 to the viable invocation 919). This can occur, for example, in a context in which the determination 286 is partly based on a user-provided action 253 (e.g. an actuation of a "do not implement" control 252 or similar "block" indication) or lack thereof (e.g. when a user 10A does not click on a "block" control that is displayed simultaneously with a "seconds until implementation" timer that counts down to zero). If the response 180 to the viable invocation(s) is blocked then flow passes to operation 1095, otherwise it passes to operation 1045.

Operation 1045 describes implementing the one or more viable invocations (e.g. another instance of implementation logic 323 triggering suitable protocols 105 or circuitry 320 as described herein). Flow then passes to operation 1055.

Operation 1055 describes obtaining a determination whether or not a latest user action established one or more viable invocations (e.g. another instance of interface and control logic 324, 328 obtaining a determination whether or not one or more recent invocations 919 are unsuitable for tracking). This can occur, for example, in a context in which a default setting of a privacy protection protocol 105J excludes each incoming user 10 from tracking and the given user 10A has yet to modify that default "do not track" setting). If tracking is blocked then flow passes to operation 1095, otherwise it passes to operation 1060.

Operation 1060 describes reflecting on-chain module changes in event-sequence descriptive data (e.g. an instance of tracking logic 327 passing one or more elements 373 or records 189 concerning token transfer or other event attributes 175 initially as off-chain ESD data 384, 584 with on-chain metadata 581 thereof providing a summary or result 288 thereof). This can occur, for example, in a context in which such ESD data 384, 584 later becomes on-chain by virtue of a hash function thereof occasionally being recorded in an annotation token 568. Flow then passes to operation 1065.

Operation 1065 describes determining whether a size threshold has been reached (e.g. another instance of recognition and control logic 322, 328 computing a size-related attribute 175 has reached a size threshold 171 and acting upon the comparison result 288). This can occur, for example, in a context in which the size-related attribute 171 reflects a size 164, a size-indicative count 165, or some number of computed parameters 167 based on such factors). If the one or more computed parameters 167 have crossed or otherwise reached any applicable threshold 171 as a component of a recognized result 288 signaling a "large enough" size, then flow passes to operation 1070, otherwise it passes to operation 1095.

Operation 1070 describes signaling an autonomy enhancement (e.g. another instance of interface logic 324 signaling a first user 10A about undergoing an autonomy enhancement protocol 105o). This can occur, for example, in a context in which the user 10A gets a notification and an opportunity to prevent the protocol 105o. Flow then passes to operation 1075.

Operation 1075 describes acting upon a determination whether or not an enhancement was blocked (e.g. another instance of interface and control logic 324, 328 requesting a decision 285 for or against the enhancement 283 or otherwise obtains a determination 286 whether or not it will be blocked). This can occur, for example, in a context in which the user 10A receives occasional suggestions (e.g. a week or more apart) favoring the enhancement 283 after the user's configuration passes its threshold 171 and in which the enhancement eventually occurs by default unless the user 10A regularly replies by signaling a contrary preference or expresses a decision 285 to terminate the suggestions. If the enhancement is blocked then flow passes to operation 1095, otherwise it passes to operation 1085.

Operation 1085 describes implementing the responsive autonomy enhancement (e.g. another instance of implementation logic 323 executing the enhancement 283 by which the user 10A becomes more autonomous). This can occur as described herein, for example, in a context in which the enhancement 283 gives the first user 10A or affiliated parties new access or authority or takes away one or more privileges 188 from a custodial or other trusted entity 110 (or both). Flow then passes to operation 1095.

Operation 1095 describes completing the loop comprising one or more iterations of operations responsive to each user action (e.g. another instance of control logic 328 passing control back to operation 1025 if there is another user action 253 to process or otherwise allowing control flow 1000 to conclude).

In light of teachings herein, numerous existing techniques may be applied for configuring special-purpose circuitry or other structures effective for addressing token holder privacy, metadata linkage disruptions, and other blockchain-related issues as described herein without undue experimentation. See, e.g., U.S. patent Ser. No. 11/700,266 ("Virtual browser application systems and methods); U.S. patent Ser. No. 11/665,154 ("System and related method for authentication and association of multi-platform accounts"); U.S. patent Ser. No. 11/621,852 ("System and method for providing a multiple-operation transaction to a blockchain"); U.S. patent Ser. No. 11/615,399 ("Method and system for obfuscating sensitive personal data in processes requiring personal identification in unregulated platforms"); U.S. patent Ser. No. 11/606,291 ("Access control and ownership transfer of digital content using a decentralized content fabric and ledger); U.S. patent Ser. No. 11/599,431 ("Database optimized disaster recovery orchestrator"); U.S. patent Ser. No. 11/570,214 ("Crowdsourced innovation laboratory and process implementation system); U.S. patent Ser. No. 11/334,883 ("Systems, methods, and program products for modifying the supply, depositing, holding and/or distributing collateral as a stable value token in the form of digital assets); U.S. patent Ser. No. 11/308,487 ("System, method and program product for obtaining digital assets); U.S. patent Ser. No. 11/288,138 ("Recovery from a system fault in a cloud-based storage system"); U.S. patent Ser. No. 11/212,347 ("Private content storage with public blockchain metadata"); U.S. patent Ser. No. 11/157,525 ("Method and system for self-aggregation of personal data and control thereof); U.S. patent Ser. No. 11/042,556 ("Localized link formation to perform implicitly federated queries using extended computerized query language syntax); U.S. patent Ser. No. 10/951,409 ("Methods and systems for verifying token-based actions on distributed ledger-based networks through the use of zero-knowledge proofs"); U.S. patent Ser. No. 10/885,021 ("Interactive interpreter and graphical user interface"); U.S. patent Ser. No. 10/268,829 ("Security systems and methods based on cryptographic utility token inventory tenure"); U.S. Pat. No. 9,417,859 ("Purity analysis using white list/black list analysis"); U.S. Pub. No. 20230245112 ("Non-interactive token certification and verification"); U.S. Pub. No. 20230034621 ("Minting, transfer and management of non-fungible tokens in sets"); U.S. Pub. No. 20220343768 ("Data exchange within a Layer Zero (L_0) HGTP, DAG, Web3 State Channel Smart Self-Healing Node Centric Blockchain Mesh Network"); U.S. Pub. No. 20220327529 ("Advanced transactional protocols and ecosystem for smart contract authoring and deployment"); U.S. Pub. No. 20220141198 ("Blockchain-based secure, anonymizing message bus"); U.S. Pub. No. 20210350357 ("System and method for participant vetting and resource responses"); U.S. Pub. No. 20210343101 ("System and method for cryptographic choice mechanisms"); U.S. Pub. No. 20210226800 ("Preserving privacy of linked cross-network transactions"); U.S. Pub. No. 20210218742 ("Computer-implemented systems for distributed authorization and federated privacy exchange"); U.S. Pub. No. 20140274078 ("Protocols for facilitating broader access in wireless communications"); and WO2023/044496 ("Systems and methods for token content unlocking, biometric authentication using privacy-protecting tokens, ownership-based limitations of content access, policy-based time capsule technology, and content lock mechanisms").

Although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, first combinations of aspects and embodiments are articulated in a shorthand form such that (1) according to respective embodiments, for each instance in which a "component" or other such identifiers appear to be introduced (e.g., with "a" or "an,") more than once in a given chain of clauses, such designations may either identify the same entity or distinct entities; and (2) what might be called "dependent" clauses below may or may not incorporate, in respective embodiments, the features of "independent" clauses to which they refer or other features described above.

Clauses

Clause 1. A context-responsive blockchain configuration method (e.g. in or interacting with one or more of the above-described systems 100, 200, 300) comprising:

invoking transistor-based circuitry (e.g. an instance of distillation and linking logic 321, 329) configured to obtain a speculative first linkage 187E among (at least) a first on-chain primary (OCP) module 375A and a first OCC module 375B partly based upon a first user action 253 pertaining to the first OCP module 375A and partly based upon a second user action 253 pertaining to (at least) the first OCC module 375B;

invoking transistor-based circuitry (e.g. another instance of distillation and linking logic 321, 329) configured to obtain a speculative second linkage 187 among a second OCC module 375D with a first user 10A-B or with a third OCC module 375E (or among both);

invoking transistor-based circuitry (e.g. an instance of implementation logic 322) configured to convert the speculative first linkage into a confirmed first linkage 187E linking the first user 10A-B with the first OCP module 375A or with the first OCC module 375B (or with both); and invoking transistor-based circuitry (e.g. an instance of distillation logic 329) to allow access by one or more other users to a first zero-knowledge proof 973 configured to protect the first user 10A-B (e.g. against doxxing or other unwanted disseminations).

Clause 2. A context-responsive blockchain configuration method (e.g. in or interacting with one or more of the above-described systems 100, 200, 300) comprising:

invoking transistor-based circuitry (e.g. an instance of linking logic 321) configured to cause a first on-chain primary (OCP) module 375A at least partly controlled by a first authorized entity 110 to be associated with a first user 10A-B and with one or more (subordinate or other) connected modules 375 that are within or otherwise related to the first OCP module 375A, wherein the first OCP module 375A is (directly or otherwise) associated with event-sequence-descriptive (ESD) data 384, 584 and wherein the ESD data 384, 584 has a first scalar size-related attribute 175A;

invoking transistor-based circuitry (e.g. an instance of control logic 328) configured to cause the ESD data 384, 584 and the first scalar size-related attribute 175A both to grow one or more times (see FIG. 1) as the first OCP module 375A records (descriptions 366 or other) indications of one or more additional events 186; and invoking transistor-based circuitry (e.g. an instance of recognition logic 322 and control logic 328 jointly) configured to respond to the first scalar size-related attribute 175A of the ESD data 384, 584 (crossing or otherwise) reaching an explicit or other first size threshold 171A by imposing or otherwise indicating an autonomy enhancement 183 (e.g. upon the first user 10A-B).

Clause 3. A context-responsive blockchain configuration method (e.g. in or interacting with one or more of the above-described systems 100, 200, 300) comprising:

invoking transistor-based circuitry (e.g. an instance of linking or implementation logic 321, 323) configured to mint one or more annotation tokens 568 that establish a definite or other first metadata linkage 187A, 587A with a first event-sequence-descriptive (ESD) data repository 588 and in a first deployment 500 (at least partly) based upon a first action 253 taken by a first user 10A-B;

invoking transistor-based circuitry (e.g. an instance of distillation and linking logic 321, 329) configured to obtain a speculative second metadata linkage 187, 587 with a second (instance of an) ESD data repository 588 based upon a second action 253 indicated in association 487 with the first user 10A-B and with the second ESD data repository 588; and invoking transistor-based circuitry (e.g. an instance of invocation or distillation logic 324, 329) configured to cause or otherwise allow access to a first zero-knowledge proof (ZKP) 973 describing or otherwise pertaining to the first or second action 253 (or both) partly based on the first metadata linkage with the first ESD data repository 588 and partly based on the speculative second metadata linkage with the second ESD data repository so that the first ZKP 973 eliminates or otherwise mitigates one or more risks 583 relating to one or more users 10 that include the first user 10A-B.

Clause 4. A context-responsive blockchain configuration method (e.g. in or interacting with one or more of the above-described systems 100, 200, 300) comprising:

invoking transistor-based circuitry (e.g. instance of distillation and linking logic 321, 329) configured to obtain a speculative metadata linkage 187, 587 with a corresponding ESD data repository 588, 988 (at least partly) based upon a first user action 253 indicated in association with a first user 10A-B and with the corresponding ESD data repository 588, 988;

and invoking transistor-based circuitry (e.g. an instance of invocation or distillation logic 324, 329) configured to cause or otherwise allow access to a first zero-knowledge proof 973 pertaining to the first user action 253 (at least partly) based on another metadata linkage 187, 587 while protecting the first user 10A-B (e.g. against doxxing or other risks).

Clause 5. A context-responsive blockchain configuration method (e.g. in or interacting with one or more of the above-described systems 100, 200, 300) comprising:

invoking transistor-based circuitry (e.g. an instance of a linking logic 321) configured to associate a first on-chain primary (OCP) module 375A with a first user 10A-B;

invoking transistor-based circuitry (e.g. an instance of implementation logic 323) configured to mint one or more annotation tokens 568 that manifest a first metadata linkage 187A, 587A in a first deployment 500 and with one or more event-sequence-descriptive (ESD) data repositories 588, 988; and invoking transistor-based circuitry (e.g. an instance of recognition logic 322 and an instance of implementation logic 323 jointly) configured to respond to (a symptomatic risk 583 or other recognizable manifestation 168 of) a first disruption 577 of the first metadata linkage 187A, 587A in the first deployment 500 on the first public blockchain 985 and with the one or more ESD data repositories 588, 988 by establishing a second metadata linkage 587B in a second deployment 600 on the first public blockchain 985 and with the one or more ESD data repositories 588, 988.

Clause 6. A context-responsive blockchain configuration method (e.g. in or interacting with one or more of the above-described systems 100, 200, 300) comprising:

invoking transistor-based circuitry (e.g. an instance of a linking logic 321) configured to associate a first on-chain primary (OCP) module 375A with a first on-chain connected (OCC) module 375B that is directly or otherwise connected to the first OCP module 375A;

invoking transistor-based circuitry (e.g. an instance of implementation logic 323) configured to mint one or more annotation tokens 568 that manifest a first metadata linkage 187A, 587A in a first deployment 500 and with one or more event-sequence-descriptive (ESD) data repositories 588, 988;

invoking transistor-based circuitry (e.g. another instance of linking logic 321) configured to allow or otherwise cause the one or more annotation tokens 568 to be assigned to a first user 10A-B; and invoking transistor-based circuitry (e.g. an instance of recognition logic 322 and an instance of implementation logic 323 jointly) configured to respond to (a symptomatic risk 583 or other recognizable manifestation 168 of) a first disruption 577 of the first metadata linkage 187A, 587A in the first deployment 500 on the first public blockchain 985 and with the one or more ESD data repositories 588, 988 by establishing a second metadata linkage 587B in a second deployment 600 on the first public blockchain 985 and with the one or more ESD data repositories 588, 988.

Clause 7. A context-responsive blockchain configuration method comprising:

invoking transistor-based circuitry (e.g. an instance of linking logic 321) configured to cause a first on-chain primary (OCP) module 375A at least partly controlled by a first authorized entity 110 to be associated with a first user 10A-B and with numerous OCC modules 375 that are associated with the first OCP module 375A;

invoking transistor-based circuitry (e.g. an instance of distillation logic 329) configured to (replace, modify, or otherwise) cause a first user-descriptive filtering (UDF) protocol 105L partly based on one or more actions 253 by the first user 10A-B signaling an explicit or other opt-in monitoring decision 285 and partly based on one or more actions 253 by the first user 10A-B signaling an explicit or other opt-out monitoring decision 285; and invoking transistor-based circuitry (e.g. an instance of implementation logic 323) configured to cause the first OCP module 375A to implement the UDF protocol 105L by configuring a metadata linkage 187, 587 among the first user 10A-B and one or more repositories 588, 988 (e.g. configured as a first profile of the first user 10A-B that contains one or more such decisions 285) so that event-sequence-descriptive (ESD) data 384, 584 partly based on the opt-in monitoring decision and partly based on the opt-out monitoring decision 285 is thereby aggregated in association (e.g. via one or more linkages 187, 587) with the first OCP module 375A.

Clause 8. The blockchain configuration method of any of the above method clauses comprising:

invoking transistor-based circuitry (e.g. an instance of implementation logic 323 and control logic 328 jointly) configured to respond to a first manifestation of a (default, explicit, or other) first user decision 285 after indicating the autonomy enhancement 183 by implementing a migration or other transformative cryptographic module deployment so as to implement the autonomy enhancement away from a first authorized entity 110.

Clause 9. The blockchain configuration method of any of the above method clauses comprising:

implementing an autonomy enhancement protocol 105o that would trigger one or more privileges 188 of a first authorized entity 110 being attenuated or eliminated as a component of the autonomy enhancement 183.

Clause 10. The blockchain configuration method of any of the above method clauses comprising:

implementing an autonomy enhancement protocol 105o that would cause one or more privileges 188 of a first user 10A-B to be enabled or otherwise expanded as a component of the autonomy enhancement 183.

Clause 11. The blockchain configuration method of any of the above method clauses comprising:

configuring a first scalar size-related attribute 175A signaling one or more (instances of) profile sizes 164, of event counts 165, or of other size-descriptive scalar values 181.

Clause 12. The blockchain configuration method of any of the above method clauses comprising:

invoking transistor-based circuitry 220 (e.g. an instance of implementation logic 323 and control logic 328 jointly) configured to respond to a manifestation 368 of a partial autonomy-indicative user decision 185 by implementing a cryptographic module deployment 600 that strips only some privileges 188 pertaining to a first on-chain primary (OCP) module 375A from the first authorized entity 110.

Clause 13. The blockchain configuration method of any of the above method clauses including a preparatory or interstitial instance of deriving a speculative first or second metadata linkage 187, 587 (at least partly) based upon a recognition of one or more qualifying user actions 253 matching one or more event selection criteria 261 (e.g. a count 165 of such actions 253 detected by an instance of recognition logic 322).

Clause 14. The blockchain configuration method of any of the above method clauses comprising:

deriving a speculative second metadata linkage 187, 587 (at least partly) based upon a determination that a count 165 of qualifying task completions or other actions 253 is effectively compared against a threshold 171 corresponding to a first event-rate-related parameter 167 provided by a second user 10C.

Clause 15. The blockchain configuration method of any of the above method clauses comprising:

distilling a speculative first and second linkage 187, 587 (at least partly) based upon one or more inbound token transfer events 186 pertaining (at least) to a first user action.

Clause 16. The blockchain configuration method of any of the above method clauses comprising:

distilling a speculative first and second linkage 187, 587 (at least partly) based upon one or more outbound token transfer events 186 pertaining to a first user action.

Clause 17. The blockchain configuration method of any of the above method clauses comprising:

distilling a speculative first and second linkage 187, 587 (at least partly) based upon one or more token transfer events 186 from or to a first OCP module 375A (or both).

Clause 18. The blockchain configuration method of any of the above method clauses comprising:

distilling a speculative first and second linkage 187, 587 (at least partly) based upon one or more token transfer events 186 to or from a first OCC module 375B.

Clause 19. The blockchain configuration method of any of the above method clauses comprising:

categorizing as "speculative" a first or second linkage 187, 587 (or both) based upon a count 165 of one or more qualifying user actions 253 matching one or more action inclusion criteria 261 provided by one or more clients 960.

Clause 20. The blockchain configuration method of any of the above method clauses comprising:

categorizing as "speculative" a first or second linkage 187, 587 based upon a first (count or other) attribute 175 of one or more user-specific events 186 matching one or more event inclusion criteria 261.

Clause 21. The blockchain configuration method of any of the above method clauses comprising:

distilling a speculative first or second linkage 187, 587 (at least partly) based upon one or more outbound or other token transfer events 186 pertaining at least to a first user action 253 matching one or more transfer inclusion criteria 261 provided by one or more clients 960.

Clause 22. The blockchain configuration method of any of the above method clauses comprising:

converting a "speculative" first or second linkage 187, 587 to a "confirmed" first or second linkage 187, 587 based upon one or more actions 253 upon the first or second linkage 187, 587 matching one or more action inclusion criteria 261.

Clause 23. The blockchain configuration method of any of the above method clauses comprising:

converting a "speculative" first or second linkage 187, 587 to a "confirmed" first or second linkage 187, 587 based upon one or more actions 253 upon one or more modules 375 thereby linked matching one or more module inclusion criteria 261 provided by one or more clients 960.

Clause 24. The blockchain configuration method of any of the above method clauses comprising:

invoking transistor-based circuitry 220 configured to respond to a (favorable or other) first manifestation 368 of an autonomy-indicative user decision 185 by implementing a more autonomous cryptographic module deployment 600.

Clause 25. The blockchain configuration method of any of the above method clauses comprising:

invoking transistor-based circuitry 220 (e.g. an instance of implementation logic 323 and control logic 328 jointly) configured to respond to a first manifestation 368 of an autonomy-indicative user decision 185 by migrating a first OCP module 375A to an autonomous cryptographic module deployment 600.

Clause 26. The blockchain configuration method of any of the above method clauses comprising:

invoking transistor-based circuitry 220 configured to respond to a favorable or other first manifestation 368 of a total-autonomy-indicative or other autonomy-indicative user decision 185 by implementing a more autonomous cryptographic module deployment 600 by reconfiguring a first OCP module 375A

Clause 27. The blockchain configuration method of any of the above method clauses comprising:

implementing the more autonomous cryptographic module deployment 600 wherein the cryptographic module deployment 600 is "more autonomous" insofar that a first privilege 188 of a first authorized entity 110 (e.g. restructuring a first OCP module 375A) is at least partly eliminated and thereby nonexistent in the more autonomous cryptographic module deployment 600.

Clause 28. The blockchain configuration method of any of the above method clauses comprising:

implementing the more autonomous cryptographic module deployment 600 wherein the cryptographic module deployment 600 is "more autonomous" insofar that a particular privilege 188 of a first authorized entity 110 (e.g. emptying or deleting a first OCP module 375A) is eliminated and thereby only available to the first user 10A-B in the more autonomous cryptographic module deployment 600.

Clause 29. The blockchain configuration method of any of the above method clauses comprising:

implementing the more autonomous cryptographic module deployment 600 wherein the cryptographic module deployment 600 is "more autonomous" insofar that a first privilege 188 of a first authorized entity 110 is at least partly eliminated and thereby nonexistent in the more autonomous cryptographic module deployment 600 and insofar that a second privilege 188 of the first authorized entity 110 is at least partly eliminated and thereby only available to the first user 10A-B in the more autonomous cryptographic module deployment 600.

Clause 30. The blockchain configuration method of any of the above method clauses wherein the more autonomous cryptographic module deployment 600 is "implemented" by migrating more than half of the on-chain data 384, 584 to one or more one or more annotation tokens 568 within a token-associated module 375 of the more autonomous cryptographic module deployment 600.

Clause 31. The blockchain configuration method of any of the above method clauses comprising:

implementing the more autonomous cryptographic module deployment 600 wherein the cryptographic module deployment 600 is "more autonomous" insofar that it is not at all controlled by a first authorized entity 110.

Clause 32. The blockchain configuration method of any of the above method clauses comprising:

allowing one or more information-seeking users 10D to receive or otherwise access a second zero-knowledge proof 973 signaling that the second and third OCC modules 375D-E of a speculative second linkage 187 are (commonly controlled or otherwise) related without disclosing who controls the second and third OCC modules 375D-E of the speculative second linkage 187.

Clause 33. The blockchain configuration method of any of the above method clauses wherein obtaining a speculative second linkage 187, 587 (is included and) comprises:

responding to a user action 253 that pertains to a second OCC module 375D or to a third OCC module 375E (or both).

Clause 34. The blockchain configuration method of any of the above method clauses comprising:

obtaining a first determination 286 partly based on a user-provided action 253 (e.g. an actuation of a "do not implement" control or similar "block" indication) or lack thereof (e.g. when a user 10A-B does not click on a "block" control that is displayed simultaneously with a "seconds until implementation" timer that counts down to zero); and causing one or more implementations (at least partly) based on a first determination 286 to include operation 1045, wherein a viable invocation 919 thereof was selected among options defined by a user 10 by a keystroke sequence or other activation 282 of one or more user controls 152.

Clause 35. The blockchain configuration method of any of the above method clauses comprising:

allowing (at least) the first user 10A-B to interact pseudonymously and trustlessly with (at least) an information-seeking user 10D.

Clause 36. The blockchain configuration method of any of the above method clauses wherein a first OCP module 375A is configured to operate as an email or other message destination.

Clause 37. The blockchain configuration method of any of the above method clauses wherein a first OCP module 375A is configured to operate as an on-chain container 465.

Clause 38. The blockchain configuration method of any of the above method clauses wherein a first OCP module 375A comprises at least one token-associated module 375.

Clause 39. The blockchain configuration method of any of the above method clauses wherein a first OCP module 375A comprises at least one smart contract 461.

Clause 40. The blockchain configuration method of any of the above method clauses wherein a first or second metadata linkage 187, 587 is "speculative" by virtue of (one or more elements 373 thereof) having no confirmed association with the first user 10A-B.

Clause 41. The blockchain configuration method of any of the above method clauses wherein allowing access to a first zero-knowledge proof 973 (ZKP) pertaining to a first or second action (is included and) comprises:
  requesting or otherwise obtaining a first succinct non-interactive argument of knowledge (SNARK) 372 that identifies an address 182 (within or otherwise) of a first ESD data repository 588, 988;
  obtaining a second SNARK 372 that identifies an address 182 of a second ESD data repository;
  requesting, generating, or otherwise obtaining the first ZKP 973 pertaining to a first or second action 253 by using both the first and second SNARKs 372; and
  transmitting the first ZKP 973 pertaining to the first or second action 253 to a first client 960 without thereby identifying the first user 10A-B.

Clause 42. The blockchain configuration method of any of the above method clauses wherein allowing access to a first zero-knowledge proof 973 (ZKP) pertaining to a first and second action (is included and) comprises:
  obtaining a first succinct non-interactive argument of knowledge (SNARK) 372 that identifies an address 182 of a first ESD data repository 588, 988;
  obtaining a second SNARK 372 that identifies an address 182 of a second ESD data repository 588, 988;
  obtaining the first ZKP 973 pertaining to a first and second action 253 by using both the first and second SNARKs 372; and
  transmitting the first ZKP 973 pertaining to the first or second action 253 to a first client 960 without thereby identifying the first user 10A-B to the first client 960.

Clause 43. The blockchain configuration method of any of the above method clauses herein allowing access to a first ZKP 973 pertaining to a first or second action (is included and) comprises:
  obtaining or otherwise triggering a first succinct non-interactive argument of knowledge (SNARK) 372 that identifies where a first ESD data repository 588, 988 is;
  obtaining a second SNARK 372 that identifies where the second ESD data repository 588, 988 is;
  triggering the first ZKP 973 pertaining to the first and second actions 253 by using both the first and second SNARKs 372; and
  giving access to a first client 960 of the first ZKP 973 pertaining to the first and second actions 253 without thereby identifying the first user 10A-B to the first client 960.

Clause 44. The blockchain configuration method of any of the above method clauses comprising:
  transmitting a first zero-knowledge proof 973 to (at least) an information-seeking user 10D, wherein the zero-knowledge proof 973 pertains (at least) to a first action 253.

Clause 45. The blockchain configuration method of any of the above method clauses wherein first and second metadata linkages 587A-B are token-related, the method comprising:
  minting one or more annotation tokens 568 so as to establish the first metadata linkage 187A, 587A among the first OCP module 375A, a first OCC module 375B, and the one or more event-sequence-descriptive (ESD) data repositories 588, 988; and
  giving a first authorized entity 110 at least one privilege 188 that the first user 10A-B lacked so that the first authorized entity 110 can configure the first metadata linkage 187A, 587A among the first OCP module 375A and the one or more ESD data repositories 588, 988 and so that the first user 10A-B cannot (directly) modify the first metadata linkage 187A, 587A.

Clause 46. The blockchain configuration method of any of the above method clauses wherein responding to a first disruption 577 of a first metadata linkage 187A, 587A (is included and) comprises:
  iteratively improving a first (risk-indicative or other tracked) value 281 that guides machine learning logic 326 so as to allow training data 384, 584 pertaining to one or more prior disruptions 577 to improve a security protocol 105P.

Clause 47. The blockchain configuration method of any of the above method clauses comprising:
  obtaining a first manifestation 168 of a first disruption 577 comprising one or more redeployment-authorizing user actions 253 signaling that the first user 10A-B no longer controls a first on-chain primary (OCP) module 375A or otherwise signaling that the one or more annotation tokens 568 no longer describe the first user 10A-B accurately.

Clause 48. The blockchain configuration method of any of the above method clauses comprising:
  obtaining a first manifestation 168 of a first disruption 577 comprising one or more user actions 253 that explicitly indicate an activation of a special-purpose control 252 (e.g. a text-containing hyperlink) that textually labels a user preference (e.g. as an alphanumeric parameter 167) and enables a linkage restoration protocol 105A when activated.

Clause 49. The blockchain configuration method of any of the above method clauses wherein first OCP and OCC modules 375A-B "affect" a first public blockchain 985 by handling one or more tokens 568 thereof and wherein the first OCP and OCC modules 375A-B only after a first OCP module 375A (directly or otherwise) affects the first public blockchain 985.

Clause 50. The blockchain configuration method of any of the above method clauses wherein a first authorized entity 110 is "selectively" authorized in that at least a first annotation token 568A of the one or more annotation tokens 568 on a first public blockchain 985 cannot be moved by the first user 10A-B but can be moved by the authorized entity 110;

Clause 51. The blockchain configuration method of any of the above method clauses comprising:
  causing the one or more annotation tokens 568 to be assigned to the first user 10A-B without making the first user 10A-B able to (re-establish or otherwise) establish a first metadata linkage 187A, 587A among a first OCP module 375A and the one or more ESD data repositories 588, 988; and
  enabling a first authorized entity 110 to invoke a linkage restoration protocol 105A by which a second metadata linkage 587B among the first OCP module 375A and one or more event-sequence-descriptive (ESD) data repositories 588, 988 is made functional as a component of resolving a first disruption 577.

Clause 52. The blockchain configuration method of any of the above method clauses wherein responding to a first disruption 577 of a first metadata linkage 587A (is included and) comprises:
  executing or otherwise invoking a disruption response protocol 105B that causes a first description 163 of the first disruption 577 to be obtained;
  invoking a data evaluation protocol 105i that recognizes and signals an unsuitability of a first ESD data repository 588, 988 of the one or more ESD data repositories 588, 988 (at least partly) based on a size 164 of a first description 163 of the first disruption 577; and directly requesting or otherwise causing more than half of a byte count 165 of a first description 163 of the first disruption 577 to be stored in one or more other ESD data repositories 588, 988 of the one or more ESD data repositories 588, 988.

Clause 53. The blockchain configuration method of any of the above method clauses comprising:

modifying or inserting at least some off-chain data 384, 584 in one or more ESD data repositories 588, 988 before the first user 10A-B obtains any access to or influence over the one or more annotation tokens 568; and modifying or inserting at least some other off-chain data 384, 584 in one or more ESD data repositories 588, 988 after the first user 10A-B first obtains access to or influence over the one or more annotation tokens 568.

Clause 54. The blockchain configuration method of any of the above method clauses comprising:

creating a linkage 187, 587 or other association 487 between one or more reference modules 375D-E that were previously used by the first user 10A-B and the one or more annotation tokens 568 whereby the first user 10A-B obtains access to or influence over the one or more annotation tokens 568 (or both) and whereby the one or more on-chain connected (OCC) modules 375 come to be associated with the one or more reference modules 375D-E.

Clause 55. The blockchain configuration method of any of the above method clauses wherein responding to a first disruption 577 of a first metadata linkage 187A, 587A comprises:

responding to a first disruption 577 comprising a newfound security risk 583 associated with a first (token transfer or other) recorded event 186 by inserting description 163 of the newfound security risk 583 into the one or more ESD data repositories 588, 988 and by inserting a disruption-type-indicative metadata flag 582 that corresponds to a first description 163 of the newfound security risk 583 into the one or more annotation tokens 568.

Clause 56. The blockchain configuration method of any of the above method clauses wherein responding to a first disruption 577 of a first metadata linkage 187A, 587A (is included and) comprises:

responding to a first disruption 577 comprising a newfound security risk 583 (e.g. identified less than 24 hours earlier) associated with a first recorded event 186 by inserting a first description 163 of the newfound security risk 583 into at least one of the ESD data repositories 588, 988 and by inserting a disruption-type-indicative metadata flag 582 that corresponds to the first description 163 of the newfound security risk 583 into the one or more annotation tokens 568.

Clause 57. The blockchain configuration method of any of the above method clauses wherein responding to a first disruption 577 of a first metadata linkage 187A, 587A comprises:

responding to (a risk-indicative user action 253 or other manifestation 168 of) a first confirmed or other disruption 577 comprising a newfound security risk 583 associated with a first recorded event 186 by inserting a first (compressed or other) description 163 of the newfound security risk 583 into the one or more ESD data repositories 588, 988 and by inserting a description-location-indicative metadata flag 582 that corresponds to a first description 163 of the newfound security risk 583 into the one or more annotation tokens 568.

Clause 58. The blockchain configuration method of any of the above method clauses wherein responding to a first disruption 577 of a first metadata linkage 187A, 587A (is included and) comprises:

supporting an allow-list record 189 (e.g. a so-called "whitelisted" record) with entity-specific description 163.

Clause 59. The blockchain configuration method of any of the above method clauses wherein responding to a first disruption 577 of a first metadata linkage 187A, 587A comprises:

supporting an allow-list record 189 with event-specific description 163.

Clause 60. The blockchain configuration method of any of the above method clauses wherein responding to a first disruption 577 of a first metadata linkage 187A, 587A (is included and) comprises:

supporting an allow-list record 189 with entity-specific description 163.

Clause 61. The blockchain configuration method of any of the above method clauses wherein responding to a first disruption 577 of a first metadata linkage 187A, 587A (is included and) comprises:

supporting an allow-list record 189 with event-specific or entity-specific description 163 (or both) in one or more ESD data repositories 588, 988.

Clause 62. The blockchain configuration method of any of the above method clauses wherein responding to a first disruption 577 of a first metadata linkage 187A, 587A comprises:

supporting an allow-list record 189 with event-specific and entity-specific description 163 in one or more ESD data repositories 588, 988.

Clause 63. The blockchain configuration method of any of the above method clauses wherein responding to a first disruption 577 of a first metadata linkage 187A, 587A (is included and) comprises:

implementing a security protocol 105P by which (at least) one or more annotation tokens 568 are modified pursuant to adjusting a first risk 583.

Clause 64. The blockchain configuration method of any of the above method clauses wherein responding to a first disruption 577 of a first metadata linkage 187A, 587A comprises:

implementing a security protocol 105P by which at least a portion of one or more annotation tokens 568 is modified pursuant to reducing a first (quantified indication of) risk 583 in response to the first metadata linkage 187, 587 being reclassified (e.g. in which a status or other "type" value 281 pertaining to the linkage transitions from "speculative" to "confirmed").

Clause 65. The blockchain configuration method of any of the above method clauses wherein responding to a first disruption 577 of a first metadata linkage 187A, 587A (is included and) comprises:

implementing one or more security protocols 105P by which one or more annotation tokens 568 are modified so as to adjust a first scalar value 281 that is (inversely or otherwise) indicative of risk 583 and by which (at least one of) the one or more annotation tokens 568 are modified pursuant to adjusting a first scalar value 281 of risk 583.

Clause 66. The blockchain configuration method of any of the above method clauses wherein responding to a first disruption 577 of a first metadata linkage 187A, 587A comprises:
implementing at least a first (instance of a) security protocol 105P that creates a first allow-list record 189 signaling a particular entity (e.g. a new partner or other user 10D identified with a name, contact information, biometric individuation, or other digital manifestation 168) having become a trusted entity 110.

Clause 67. The blockchain configuration method of any of the above method clauses wherein responding to a first disruption 577 of a first metadata linkage 187A, 587A (is included and) comprises:
implementing a security protocol 105P that creates or updates a first allow-list record 189 signaling a particular entity having become a trusted entity 110 by a delegation protocol 105N wherein the first user 10A-B designates one or more other users 10C-D as the trusted entity 110 and wherein the trusted entity thereby acquires one or more new privileges.

Clause 68. The blockchain configuration method of any of the above method clauses wherein responding to a first disruption 577 of a first metadata linkage 187A, 587A comprises:
implementing a security protocol 105P by which one or more annotation tokens 568 are modified pursuant to elevating a particular entity into a trusted entity 110.

Clause 69. The blockchain configuration method of any of the above method clauses wherein responding to a first disruption 577 of a first metadata linkage 187A, 587A (is included and) comprises:
modifying one or more annotation tokens 568 so as to adjust a first (quantified indication of) risk 583.

Clause 70. The blockchain configuration method of any of the above method clauses wherein a first authorized entity 110 is "selectively" authorized in that at least a first one of the annotation tokens 568 on a first public blockchain 985 cannot be moved by the first user 10A-B but can be moved with permission from the first authorized entity 110.

Clause 71. The blockchain configuration method of any of the above method clauses wherein a first authorized entity 110 is "selectively" authorized in that at least a first one of the annotation tokens 568 on a first public blockchain 985 can only be transferred via an authorization from the authorized entity.

Clause 72. The blockchain configuration method of any of the above method clauses wherein a first disruption 577 of a first metadata linkage 187A, 587A comprises an interference of a first module association 487 with the first user 10A-B causing an evaluation protocol 105i to signal an unsuitability of a first module association 487 for enabling the first user 10A-B to access numerous other OCC modules 375.

Clause 73. The blockchain configuration method of any of the above method clauses wherein a first disruption 577 of a first metadata linkage 187A, 587A comprises an obfuscation of a first module association 487 with the first user 10A-B (directly or otherwise) causing an evaluation protocol 105i to signal an unsuitability of the first module association 487 for enabling the first user 10A-B to access numerous other OCC modules 375.

Clause 74. The blockchain configuration method of any of the above method clauses wherein a first disruption 577 of a first metadata linkage 187A, 587A comprises an interruption of a first module association 487 with the first user 10A-B (directly or otherwise) causing an evaluation protocol 105i to signal an unsuitability of a first module association for enabling the first user 10A-B to access numerous other OCC modules 375.

Clause 75. The blockchain configuration method of any of the above method clauses wherein a first disruption 577 of a first metadata linkage 187A, 587A comprises an aspersion of the first user 10A-B with a first module association 487 causing (e.g. in response to a worsening risk 583 of misguided enforcement actions against the first user 10A-B) an evaluation protocol 105i to signal an unsuitability of a first module association 487 for protecting one or more other modules 375 (directly or otherwise) associated with the first user 10A-B from being doxed.

Clause 76. The blockchain configuration method of any of the above method clauses wherein responding to a first disruption 577 of a first metadata linkage 187A, 587A includes recording a first quantified exacerbated risk 583 (e.g. signaling a recognition of one or more criteria indicating an apparent attack or leak) using at least one of one or more annotation tokens 568 pursuant to a security protocol 105P.

Clause 77. The blockchain configuration method of any of the above method clauses wherein numerous connected token-associated modules 375 including a first OCC module 375 are in an unbroken grouping insofar that each of the numerous connected token-associated modules 375 are connected to one or more others of the numerous connected token-associated modules 375.

Clause 78. The blockchain configuration method of any of the above method clauses wherein responding to a first disruption 577 of a first metadata linkage 187A, 587A comprises:
iteratively improving a first value 281 that guides (an instance of) machine learning logic 326.

Clause 79. The blockchain configuration method of any of the above method clauses wherein responding to a first disruption 577 of a first metadata linkage 187A, 587A comprises:
iteratively improving a first (efficiency-indicative or other) value 281 that guides machine learning logic 326 so as to use training data 384, 584 pertaining to one or more prior disruptions 577 to improve a token configuration protocol 105D.

Clause 80. The blockchain configuration method of any of the above method clauses wherein responding to a first disruption 577 of a first metadata linkage 187A, 587A in a first deployment 500 on a first public blockchain 985 and with the one or more event-sequence-descriptive (ESD) data repositories by establishing the second metadata linkage 587B in the second deployment 600 on a first public blockchain 985 and with the one or more event-sequence-descriptive (ESD) data repositories 588, 988 (is included and) comprises:
copying or otherwise migrating at least some content from a first annotation token 568A of one or more annotation tokens 568 to a destination annotation token 568B of the second deployment 600.

Clause 81. The blockchain configuration method of any of the above method clauses wherein associating a first OCP module 375A with a first OCC module 375B comprises:
configuring a first deployment 500 to include at least a first one of one or more annotation tokens 568 in a first OCP module 375A and manifesting a first metadata linkage 187A, 587A.

Clause 82. The blockchain configuration method of any of the above method clauses wherein associating a first OCP module 375A with (at least) a first OCC 375B (is included and) comprises:

establishing an intermodular linkage 187E directly spanning a first OCP module 375A and a first OCC 375B.

Clause 83. The blockchain configuration method of any of the above method clauses comprising:

giving a first authorized entity 110 at least one privilege 188 that the first user 10A-B lacks so that a first authorized entity 110 can directly modify a first metadata linkage 187A, 587A among a first OCP module 375A and the one or more ESD data repositories 588, 988 and so that the first user 10A-B cannot (directly) modify a first metadata linkage 187A, 587A.

Clause 84. The blockchain configuration method of any of the above method clauses wherein a first metadata linkage 187A, 587A is among a first OCP module 375A on a first blockchain 985 and at least one off-chain repository 988 of the one or more ESD data repositories 588, 988.

Clause 85. The blockchain configuration method of any of the above method clauses wherein a first metadata linkage 187A, 587A is among a first OCP module 375A and at least some of the one or more ESD data repositories 588, 988 and wherein responding to a first authorized entity 110 comprises:

assigning a first annotation token 568A and numerous OCC modules 375 including a first, second, and third OCC modules 375 to the first user 10A-B.

Clause 86. The blockchain configuration method of any of the above method clauses wherein responding to a first disruption 577 of a first metadata linkage 187A, 587A includes recognizing and responding to user input 951 signaling that one or more users 10A-C including the first user 10A-B have lost access to at least one of one or more annotation tokens 568 as an element 373 of a first disruption 577 of a first metadata linkage 187A, 587A.

Clause 87. The blockchain configuration method of any of the above method clauses wherein responding to a first disruption 577 of a first metadata linkage 187A, 587A includes recognizing and responding to user input 951 signaling that one or more users 10A-C including the first user 10A-B have lost control 252 of at least one of one or more annotation tokens 568 as an element 373 of a first disruption 577 of a first metadata linkage 187A, 587A.

Clause 88. The blockchain configuration method of any of the above method clauses wherein responding to a first disruption 577 of a first metadata linkage 187A, 587A includes recognizing an alteration of a first OCP module 375A as an element 373 of a first disruption 577 of a first metadata linkage 187A, 587A.

Clause 89. The blockchain configuration method of any of the above method clauses wherein responding to a first disruption 577 of a first metadata linkage 187A, 587A includes recognizing an obliteration of a first OCP module 375A as an element 373 of a first disruption 577 of a first metadata linkage 187A, 587A.

Clause 90. The blockchain configuration method of any of the above method clauses wherein responding to a first disruption 577 of a first metadata linkage 187A, 587A includes recognizing an alteration of at least a first annotation token 568 of one or more annotation tokens 568 as an element of a first disruption 577 of a first metadata linkage 187A, 587A.

Clause 91. The blockchain configuration method of any of the above method clauses wherein responding to a first disruption 577 of a first metadata linkage 187A, 587A includes recognizing an obliteration of a first OCP module 375A as an element 373 of a first disruption 577 of a first metadata linkage 187A, 587A.

Clause 92. The blockchain configuration method of any of the above method clauses comprising:

obtaining a first manifestation 168 of a first disruption 577 comprising one or more user actions 253 that explicitly indicate that the first user 10A-B no longer controls a first on-chain primary (OCP) module 375A.

Clause 93. The blockchain configuration method of any of the above method clauses comprising:

obtaining a first manifestation 168 of a first disruption 577 comprising one or more user actions 253 that explicitly indicate an activation of a special-purpose control 252 (e.g. a text-containing hyperlink) that textually labels a user preference (e.g. as an alphanumeric parameter 167) and enables a security protocol 105P when activated.

Clause 94. The blockchain configuration method of any of the above method clauses comprising:

obtaining a first manifestation 168 of a first disruption 577 comprising one or more user actions 253 that explicitly indicate an activation of a special-purpose control 252 (e.g. a text-containing hyperlink) that textually labels a user preference (e.g. as an alphanumeric parameter 167) and enables a privacy protection protocol 105J when activated.

Clause 95. The blockchain configuration method of any of the above method clauses comprising:

obtaining a first manifestation 168 of a first disruption 577 comprising one or more user actions 253 that explicitly indicate an activation of a special-purpose control 252 (e.g. a text-containing hyperlink) that textually labels a user preference (e.g. as an alphanumeric parameter 167) and enables an immediate or other disruption response protocol 105B when activated.

Clause 96. The blockchain configuration method of any of the above method clauses comprising:

obtaining a first manifestation 168 of a first disruption 577 comprising one or more user actions 253 that explicitly indicate an activation of a special-purpose control 252 (e.g. a text-containing hyperlink) that textually labels a user preference (e.g. as an alphanumeric parameter 167) and enables a delayed or other evaluation protocol 105$i$ when activated.

Clause 97. The blockchain configuration method of any of the above method clauses metadata linkage 187A, 587A is among a first OCP module 375A on a first blockchain 985 and at least one on-chain repository 588 of the one or more ESD data repositories 588, 988.

Clause 98. The blockchain configuration method of any of the above method clauses wherein causing one or more annotation tokens 568 to be assigned to the first user 10A-B (is included and) comprises:

transmitting to the first user 10A-B a security parameter 167 (e.g. a mnemonic value 281 or private key value 281) that controls or otherwise allows access to a module 375 that contains at least one of one or more annotation tokens 568.

Clause 99. The blockchain configuration method of any of the above method clauses comprising:

configuring a first OCC module 375B to be directly connected to a first OCP module 375A by causing a first OCP module 375A to refer to a first OCC module 375B.

Clause 100. The blockchain configuration method of any of the above method clauses comprising:

configuring a first OCC module 375B to be directly connected to a first OCP module 375A by causing a first OCC module 375B to refer to a first OCP module 375A.

Clause 101. The blockchain configuration method of any of the above method clauses comprising:
giving a first authorized entity 110 at least one privilege 188 that the first user 10A-B lacks so that a first authorized entity 110 can directly modify or replace a first metadata linkage 187A, 587A among a first OCP module 375A and the one or more ESD data repositories 588, 988 that include at least some off-chain data 384, 584 and so that the first user 10A-B cannot (directly) modify or replace a first metadata linkage 187A, 587A.

Clause 102. The blockchain configuration method of any of the above method clauses comprising:
obtaining a first manifestation 168 of a first disruption 577 comprising one or more risk-indicative user actions 253 signaling that the first user 10A-B no longer controls a first on-chain primary (OCP) module 375A.

Clause 103. The blockchain configuration method of any of the above method clauses comprising:
obtaining a first manifestation 168 of a first disruption 577 comprising one or more risk-indicative user actions 253 signaling that (at least one of) one or more annotation tokens 568 no longer describe the first user 10A-B accurately.

Clause 104. The blockchain configuration method of any of the above method clauses comprising:
obtaining a first manifestation 168 of a first disruption 577 comprising one or more redeployment-authorizing user actions 253 from the first user 10A-B; and
responding to the one or more redeployment-authorizing user actions 253 from the first user 10A-B by minting one or more annotation tokens 568 in a second on-chain primary (OCP) module 375A; and
assigning the second on-chain primary (OCP) module 375A to (at least) the first user 10A-B.

Clause 105. The blockchain configuration method of any of the above method clauses comprising:
obtaining a first manifestation 168 of a first disruption 577 comprising one or more user actions 253 that explicitly indicate that the first user 10A-B no longer controls a first on-chain primary (OCP) module 375A.

Clause 106. The blockchain configuration method of any of the above method clauses wherein a first metadata linkage 187A, 587A is among a first OCP module 375A on a first blockchain 985 and at least one on-chain repository 588 of the one or more ESD data repositories 588, 988.

Clause 107. The blockchain configuration method of any of the above method clauses wherein causing one or more annotation tokens 568 to be assigned to the first user 10A-B comprises:
transmitting to the first user 10A-B a security parameter 167 (e.g. a mnemonic value 281 or private key value 281) that controls or otherwise allows access to a module 375 that contains at least one of one or more annotation tokens 568.

Clause 108. The blockchain configuration method of any of the above method clauses comprising:
configuring a first OCC module 375B to be directly connected to a first OCP module 375A by causing a first OCP module 375A to refer to a first OCC module 375B.

Clause 109. The blockchain configuration method of any of the above method clauses comprising:
configuring a first OCC module 375B to be directly connected to a first OCP module 375A by causing a first OCC module 375B to refer to a first OCP module 375A.

Clause 110. The blockchain configuration method of any of the above method clauses comprising:
giving a first authorized entity 110 at least one privilege 188 that the first user 10A-B lacks so that a first authorized entity 110 can directly modify or replace a first metadata linkage 187A, 587A among a first OCP module 375A and the one or more ESD data repositories 588, 988 and so that the first user 10A-B cannot (directly) modify or replace a first metadata linkage 187A, 587A.

Clause 111. The blockchain configuration method of any of the above method clauses comprising:
obtaining a first manifestation 168 of a first disruption 577 comprising one or more risk-indicative user actions 253 signaling that the first user 10A-B no longer controls a first on-chain primary (OCP) module 375A.

Clause 112. The blockchain configuration method of any of the above method clauses comprising:
obtaining a first manifestation 168 of a first disruption 577 comprising one or more risk-indicative user actions 253 signaling that (at least one of) one or more annotation tokens 568 no longer describe the first user 10A-B accurately.

Clause 113. The blockchain configuration method of any of the above method clauses comprising:
obtaining a first manifestation 168 of a first disruption 577 comprising one or more redeployment-authorizing user actions 253 from the first user 10A-B; and
responding to the one or more redeployment-authorizing user actions 253 from the first user 10A-B by minting one or more annotation tokens 568 in a second on-chain primary (OCP) module 375A; and
assigning the second on-chain primary (OCP) module 375A to (at least) the first user 10A-B.

Clause 114. The blockchain configuration method of any of the above method clauses wherein a first security protocol is configured to respond to a first invocation 919 to transfer one or more annotation tokens 568 by transmitting an error message to a sender of a first invocation 919.

Clause 115. The blockchain configuration method of any of the above method clauses wherein numerous connected token-associated modules 375 including a first OCC module 375 are in an unbroken grouping insofar that each of the numerous connected token-associated modules 375 are connected to one or more others of the numerous connected token-associated modules 375.

Clause 116. The blockchain configuration method of any of the above method clauses comprising:
causing one or more annotation tokens 568 to be assigned to the first user 10A-B without making the first user 10A-B able to (re-establish or otherwise) establish a first metadata linkage 187A, 587A among a first OCP module 375A and the one or more ESD data repositories 588, 988.

Clause 117. The blockchain configuration method of any of the above method clauses comprising:
obtaining a first manifestation 168 of a first disruption 577 comprising one or more redeployment-indicative user actions 253 that signal that the first user 10A-B no longer controls a first on-chain primary (OCP) module 375A and that include an activation of a special-purpose control 252 (e.g. a "restore my account" button).

Clause 118. The blockchain configuration method of any of the above method clauses wherein associating a first on-chain primary (OCP) module 375A (is included and) comprises:
connecting a first on-chain primary (OCP) module 375A on a first public blockchain 985 with numerous (directly connected or other) on-chain connected (OCC) modules 375 including a first OCC module 375B that is directly connected to a first OCP module 375A and a second OCC module 375ƒ that is only indirectly connected to a first OCP module 375A.

Clause 119. The blockchain configuration method of any of the above method clauses wherein associating a first on-chain primary (OCP) module 375A comprises:
connecting a first on-chain primary (OCP) module 375A on a first public blockchain 985 with numerous (directly connected or other) on-chain connected (OCC) modules 375 including a first OCC module 375B that is directly connected to a first OCP module 375A and a second OCC module 375ƒ that is only indirectly connected to a first OCP module 375A; and
recording a token transfer to or from the second OCC module 375ƒ.

Clause 120. The blockchain configuration method of any of the above method clauses wherein responding to a first disruption 577 of a first metadata linkage 187A, 587A includes adding metadata 581 signaling a first user action 253 to a first OCP module 375A and to the one or more (on-chain or other) ESD data repositories both.

Clause 121. The blockchain configuration method of any of the above method clauses wherein responding to a first authorized entity 110 (is included and) comprises:
assigning a first annotation token 568A and numerous OCC modules 375 including a first, second, and third OCC modules 375 to the first user 10A-B.

Clause 122. The blockchain configuration method of any of the above method clauses wherein a first metadata linkage 187A, 587A is among a first OCP module 375A and at least some of the one or more ESD data repositories 588, 988.

Clause 123. The blockchain configuration method of any of the above method clauses wherein responding to a first disruption 577 of a first metadata linkage 187A, 587A includes recognizing a missing metadata component 289 of a first OCP module 375A as an element 373 of a first disruption 577 of a first metadata linkage 187A, 587A.

Clause 124. The blockchain configuration method of any of the above method clauses wherein responding to a first disruption 577 of a first metadata linkage 187A, 587A includes implementing a revised protocol 105A-T that calls for recognizing a new (type of) component of metadata 581 and detecting an absence of the new component of metadata 581 as an element 373 of a first disruption 577 of a first metadata linkage 187A, 587A by which the annotation token 568 is rendered noncompliant (e.g. with a new security protocol 105P).

Clause 125. The blockchain configuration method of any of the above method clauses wherein responding to a first disruption 577 of a first metadata linkage 187A, 587A includes detecting an unsuitability of at least one of one or more annotation tokens 568 pursuant to a privacy protection protocol 105J.

Clause 126. The blockchain configuration method of any of the above method clauses wherein responding to a first disruption 577 of a first metadata linkage 187A, 587A comprises:
invoking a disruption response protocol 105B that (when invoked directly or otherwise) causes a first description 163 of a first disruption 577 to be (generated or otherwise) obtained.

Clause 127. The blockchain configuration method of any of the above method clauses wherein responding to a first disruption 577 of a first metadata linkage 187A, 587A comprises:
invoking a disruption response protocol 105B that directly or otherwise causes a first description 163 of a first disruption 577 to be (recorded or otherwise) transmitted.

Clause 128. The blockchain configuration method of any of the above method clauses wherein responding to a first disruption 577 of a first metadata linkage 187A, 587A (is included and) comprises:
invoking a disruption response protocol 105B that causes a first (warning, stack dump, or other) description 163 of a first disruption 577 to be obtained; and
invoking a data evaluation protocol 105i that recognizes and signals an unsuitability of a first ESD data repository 588, 988 of the one or more ESD data repositories 588, 988 (at least partly) based on a size 164 of a first description 163 of a first disruption 577.

Clause 129. The blockchain configuration method of any of the above method clauses wherein responding to a first authorized entity 110 comprises modifying at least some off-chain data 384, 584 in the one or more ESD data repositories before the first user 10A-B has any access to or influence over one or more annotation tokens 568.

Clause 130. The blockchain configuration method of any of the above method clauses comprising:
modifying at least some off-chain data 384, 584 in one or more ESD data repositories 588, 988 after the first user 10A-B first obtains access to or influence over one or more annotation tokens 568.

Clause 131. The blockchain configuration method of any of the above method clauses wherein the responding to a first authorized entity 110 by causing one or more annotation tokens 568 to be assigned to the first user 10A-B comprises:
causing one or more annotation tokens 568 to be assigned to the first user 10A-B without the first user 10A-B being able or becoming able to replace one or more annotation tokens 568.

Clause 132. The blockchain configuration method of any of the above method clauses wherein the responding to a first authorized entity 110 by causing one or more annotation tokens 568 to be assigned to the first user 10A-B comprises:
causing one or more annotation tokens 568 to be assigned to the first user 10A-B without the first user 10A-B being able or becoming able to modify one or more annotation tokens 568.

Clause 133. The blockchain configuration method of any of the above method clauses wherein a first OCP module 375A and an unbroken (cluster or other) grouping of numerous OCC modules 375 that include a first, second, and third OCC modules are accessible by the first user 10A-B.

Clause 134. The blockchain configuration method of any of the above method clauses wherein a first OCP module 375A and an unbroken grouping of (at least) several OCC modules 375 that include a first, second, and third OCC modules are accessible by (at least) the first user 10A-B.

Clause 135. The blockchain configuration method of any of the above method clauses wherein a first OCP module 375A and an unbroken chain of (at least) several OCC modules 375B-G that include a first, second, and third OCC modules are controlled (at least) by the first user 10A-B.

Clause 136. The blockchain configuration method of any of the above method clauses comprising:
deriving a speculative first or second metadata linkage 187, 587 (at least partly) based upon a recognition of one or more qualifying user actions 253.

Clause 137. The blockchain configuration method of any of the above method clauses comprising:
deriving a speculative first or second metadata linkage 187, 587 based upon a recognition of one or more qualifying user actions 253 by recognition logic 322 matching one or more selection criteria 261 partly based on the first user 10A-B belonging to a user group 463 and partly based on one or more actions 253 by (some member of) the user group 463 signaling common control 252 of the first ESD data repository 588, 988.

Clause 138. The blockchain configuration method of any of the above method clauses comprising:
deriving a speculative first or second metadata linkage 187, 587 (at least partly) based upon a recognition of one or more qualifying user actions 253 by recognition logic 322 (remotely or otherwise) matching one or more selection criteria 261 partly based on the first user 10A-B belonging to a user group 463 and partly based on one or more actions 253 by the user group 463 signaling (suspicious apparent or other) association with one or more on-chain modules 375 connected via the first or second speculative second metadata linkage 187, 587.

Clause 139. The blockchain configuration method of any of the above method clauses comprising:
receiving a qualifying value 281 indicative of a first action 253 from (at least) an information-seeking user 10D;
causing a first zero-knowledge proof 973 to be generated (at least partly) based on a first action 253; and
transmitting a first zero-knowledge proof 973 to (at least) the information-seeking user 10D.

Clause 140. The blockchain configuration method of any of the above method clauses comprising:
allowing who controls a first OCP module 375A to be demonstrated by a zero-knowledge proof 973 anonymously, without disclosing any metadata 581 describing who has a cryptographic key that can access a first OCP module 375A.

Clause 141. The blockchain configuration method of any of the above method clauses comprising:
allowing who controls a first OCC module 375B to be demonstrated by a zero-knowledge proof 973 (pseudonymously or otherwise) anonymously, without disclosing any metadata 581 describing who controls a first OCC module 375B.

Clause 142. The blockchain configuration method of any of the above method clauses comprising:
allowing who controls one or more reference modules 375A-B to be demonstrated by a zero-knowledge proof 973 pseudonymously to one or more information-seeking users 10D or other clients 960B (or both), by associating a proven control 252 of the one or more reference modules 375A-B with an aliased identification 371 of who controls one or more reference modules 375A-B so as to guard against doxxing.

Clause 143. The blockchain configuration method of any of the above method clauses comprising:
allowing one or more at-risk users 10A-B who control a first OCP module 375A to be demonstrated by a particular zero-knowledge proof 973 pseudonymously to one or more information-seeking users 10D by associating a proven control 252 of a first OCP module 375A with an aliased identification 371 of the one or more at-risk users 10A-B who control a first OCP module 375A; and
enabling the one or more information-seeking users 10D to contact the one or more at-risk users 10A-B who control a first OCP module 375A pseudonymously using the aliased identification 371 so as to protect the one or more at-risk users 10A-B against doxxing.

Clause 144. The blockchain configuration method of any of the above method clauses comprising:
allowing one or more at-risk users 10A-B who control a first OCC module 375B to be demonstrated by a particular zero-knowledge proof 973 pseudonymously to one or more information-seeking users 10D by associating a proven control 252 of a first OCC module 375B with an aliased identification 371 of the one or more at-risk users 10A-B who control the first OCC module 375B; and
enabling the one or more information-seeking users 10D to contact the one or more at-risk users 10A-B who control the first OCC module 375B pseudonymously using the aliased identification 371 so as to protect the one or more at-risk users 10A-B against doxxing.

Clause 145. The blockchain configuration method of any of the above method clauses comprising:
allowing one or more at-risk users 10A-B who control a first OCP module 375A to be demonstrated by a particular zero-knowledge proof 973 pseudonymously to one or more information-seeking users 10D by associating a proven control 252 of a first OCP module 375A with an aliased identification 371 of the one or more at-risk users 10A-B who control a first OCP module 375A at a first time T1; and
enabling the one or more information-seeking users 10D to contact the one or more at-risk users 10A-B who control a first OCP module 375A pursuant to a durable pseudonymous communication protocol 105F and via the aliased identification 371 more than ten days after a first time T1.

Clause 146. The blockchain configuration method of any of the above method clauses comprising:
allowing one or more at-risk users 10A-B who control a first OCP module 375A to be demonstrated by a particular zero-knowledge proof 973 pseudonymously to one or more information-seeking users 10D by associating a proven control 252 of a first OCP module 375A with an aliased identification 371 of the one or more at-risk users 10A-B who control a first OCP module 375A at a first time T1; and
enabling the one or more information-seeking users 10D to contact the one or more at-risk users 10A-B who control a first OCP module 375A pursuant to a durable pseudonymous communication protocol 105F and via the aliased identification 371 more than ten hours after a first time T1.

Clause 147. The blockchain configuration method of any of the above method clauses comprising:
allowing one or more at-risk users 10A-B who control a first OCC module 375B to be demonstrated by a particular zero-knowledge proof 973 pseudonymously to one or more information-seeking users 10D by associating a proven control 252 of a first OCC module 375B with an aliased identification 371 of the one or more at-risk users 10A-B who control a first OCC module 375B at a first time T1; and enabling the one or more information-seeking users 10D to contact the one or more at-risk users 10A-B who control the OCC module 375B pursuant to a durable pseudonymous communication protocol 105F and via the aliased identification 371 more than ten days after a first time T1.

Clause 148. The blockchain configuration method of any of the above method clauses comprising:

allowing one or more at-risk users 10A-B who control a first OCC module 375B to be demonstrated by a particular zero-knowledge proof 973 pseudonymously to one or more information-seeking users 10D by associating a proven control 252 of a first OCC module 375B with an aliased identification 371 of the one or more at-risk users 10A-B who control a first OCC module 375B at a first time T1; and enabling the one or more information-seeking users 10D to contact the one or more at-risk users 10A-B who control the OCC module 375B pursuant to a durable pseudonymous communication protocol 105F and via the aliased identification 371 more than ten weeks after a first time T1.

Clause 149. The blockchain configuration method of any of the above method clauses comprising:

updating or otherwise setting one or more thresholds 171 or other criteria 261 described herein using a parametric security protocol 305P (at least partly) based on one or more risks 583 identified by one or more users 10.

Clause 150. The blockchain configuration method of any of the above method clauses comprising:

updating or otherwise setting one or more thresholds 171 or other criteria 261 described herein using a machine learning module 326 (at least partly) based on one or more risks 583 or other performance metrics identified by one or more users 10.

Clause 151. The blockchain configuration method of any of the above method clauses comprising:

dynamically and iteratively updating one or more thresholds 171 or other criteria 261 described herein using a machine learning module 326 (at least partly) based on one or more risks 583 or other performance-indicative scoring values 281 identified by one or more users 10.

Clause 152. The blockchain configuration method of any of the above method clauses comprising:

preventing any clients 960 or other users 10 who have retrieved or otherwise obtained a zero-knowledge proof 973 as described herein from targeting any user 10 who controls a first OCC module 375B via a first pseudonymous or other anonymous communication protocol 105F-G.

Clause 153. The blockchain configuration method of any of the above method clauses comprising:

preventing any clients 960 or other users 10 who have retrieved or otherwise obtained a zero-knowledge proof 973 as described herein from targeting the first user 10A-B via a first pseudonymous or other anonymous communication protocol 105F-G.

Clause 154. The blockchain configuration method of any of the above method clauses comprising:

allowing whoever controls the one or more modules 375A-B to be demonstrated pseudonymously by a zero-knowledge proof 973, by associating a proven control of the one or more modules 375A-B with an aliased identification 371 of whoever controls one or more modules 375A-B so as to guard against doxxing.

Clause 155. The blockchain configuration method of any of the above method clauses wherein a first security protocol actually responds to a first invocation 919 to transfer one or more annotation tokens 568 by transmitting an error message to a sender of a first invocation 919.

Clause 156. The blockchain configuration method of any of the above method clauses wherein a first security protocol is configured to respond to a first invocation 919 to transfer one or more annotation tokens 568 by transmitting a first error message to a sender of a first invocation 919 only if the sender of a first invocation 919 is the first user 10A-B.

Clause 157. The blockchain configuration method of any of the above method clauses wherein a first security protocol is configured to respond to a first invocation 919 to transfer one or more annotation tokens 568 by transmitting an error message to a sender of a first invocation 919 only if the sender of a first invocation 919 is the first user 10A-B or is another user authorized by the first user 10A-B.

Clause 158. The blockchain configuration method of any of the above method clauses wherein a security protocol is configured to respond to any invocation 919 to transfer one or more annotation tokens 568 by transmitting a warning message to a first authorized entity 110.

Clause 159. The blockchain configuration method of any of the above method clauses wherein a token transfer invocation 919 is denied as invalid by virtue of originating in a token-associated module 375 that contains an annotation token 568.

Clause 160. The blockchain configuration method of any of the above method clauses wherein a data update invocation 919 is denied as invalid due to having originated from an unvetted source (e.g. a neophyte user 10 or unknown client 960C) rather than from an authorized entity 110.

Clause 161. The blockchain configuration method of any of the above method clauses wherein a data update invocation 919 is denied as invalid pursuant to a security protocol 105P indicating that the data update invocation 919 (apparently or otherwise) originated from the first user 10A-B alone.

Clause 162. The blockchain configuration method of any of the above method clauses wherein a data update invocation 919 is denied as invalid due to having originated from an unauthorized human or other entity (e.g. a malicious user 10D or unpredictable client 960C) rather than from an authorized entity 110.

Clause 163. The blockchain configuration method of any of the above method clauses wherein numerous connected token-associated modules 375 are connected insofar that each of the numerous connected token-associated modules 375 are connected to one or more others of the numerous connected token-associated modules 375.

Clause 164. The blockchain configuration method of any of the above method clauses wherein numerous connected token-associated modules 375 are connected insofar that each of the numerous connected token-associated modules 375 are connected to at least one other one of the numerous connected token-associated modules 375 in a single contiguous grouping.

Clause 165. The blockchain configuration method of any of the above method clauses wherein numerous connected token-associated modules 375 are connected insofar that each of the numerous connected token-associated modules 375 are connected to at least one other one of the numerous connected token-associated modules 375 in a single contiguous linear grouping.

Clause 166. The blockchain configuration method of any of the above method clauses wherein at least some of numerous connected token-associated modules 375 are occupied by at least some user content.

Clause 167. The blockchain configuration method of any of the above method clauses wherein at least some connected token-associated modules 375 are occupied by at least some user content comprising one or more event records 189.

Clause 168. The blockchain configuration method of any of the above method clauses wherein at least some of the numerous connected token-associated modules 375 are occupied by at least some user content comprising one or more resource transfer records 189.

Clause 169. The blockchain configuration method of any of the above method clauses wherein at least some of the numerous connected token-associated modules 375 are occupied by at least some user content comprising one or more cryptographic token transfer records 189.

Clause 170. The blockchain configuration method of any of the above method clauses wherein at least some of the numerous connected token-associated modules 375 are occupied by at least some user content comprising one or more utility token transfer records 189.

Clause 171. The blockchain configuration method of any of the above method clauses wherein at least some of the numerous connected token-associated modules 375 are occupied by at least some user content.

Clause 172. The blockchain configuration method of any of the above method clauses wherein at least some of the numerous connected token-associated modules 375 are occupied token-associated modules 375 and wherein more than half of the occupied token-associated modules 375 indicate one or more cryptographic token transfer events 186.

Clause 173. The blockchain configuration method of any of the above method clauses wherein at least some of the numerous connected token-associated modules 375 are occupied token-associated modules 375 and wherein more than half of the occupied token-associated modules 375 only indicate (one or more) cryptographic token transfer events 186.

Clause 174. The blockchain configuration method of any of the above method clauses wherein allowing access to the zero-knowledge proof 973 comprises:
transmitting a first zero-knowledge proof 973.

Clause 175. The blockchain configuration method of any of the above method clauses wherein allowing access to the zero-knowledge proof 973 comprises:
causing a first zero-knowledge proof 973 to demonstrate control of a first OCP module 375A or of a first OCC module 375B via the confirmed first linkage 187E.

Clause 176. The blockchain configuration method of any of the above method clauses wherein allowing access to the zero-knowledge proof 973 (is included and) comprises:
causing a first zero-knowledge proof 973 to demonstrate control of (at least) a first OCP module 375A without revealing who controls a first OCP module 375A.

Clause 177. The blockchain configuration method of any of the above method clauses wherein allowing access to the zero-knowledge proof 973 comprises:
causing a first zero-knowledge proof 973 to demonstrate control of a first OCC module 375B without revealing who controls a first OCC module 375B.

Clause 178. The blockchain configuration method of any of the above method clauses comprising:
allowing one or more particular users 10 who do not include the first user 10A-B to access a zero-knowledge proof 973 signaling that a first OCP module 375A and a first OCC module 375B are related without disclosing who controls a first OCP module 375A.

Clause 179. The blockchain configuration method of any of the above method clauses comprising:
allowing one or more particular users 10 who do not include the first user 10A-B to access a zero-knowledge proof 973 signaling that a first OCP module 375A and a first OCC module 375B are related without disclosing who controls a first OCC module 375B.

Clause 180. The blockchain configuration method of any of the above method clauses comprising:
allowing one or more particular users 10 who do not include the first user 10A-B to access a zero-knowledge proof 973 signaling that a first OCP module 375A and a first OCC module 375B are related anonymously, without disclosing any metadata 581 describing who controls a first OCP module 375A and a first OCC module 375B.

Clause 181. The blockchain configuration method of any of the above method clauses comprising:
obtaining from a party other than the first user 10A-B an identification 371 of a first OCC module 375B (e.g. in a request for information about the first OCC module 375B);
providing a manifestation 168 of control of the first OCC module 375B based on (a response 180 to) a user-authorized action 253 upon the first OCC module 375B; and
allowing the party to access an other zero-knowledge proof 973 signaling the manifestation 168 of control of the first OCC module 375B without disclosing who controls a first OCC module 375B.

Clause 182. The blockchain configuration method of any of the above method clauses comprising:
allowing someone to access a second zero-knowledge proof 973 signaling that a first OCP module 375A and a first OCC module 375B are related without disclosing to the someone any metadata 581 describing who controls a first OCP module 375A or a first OCC module 375B.

Clause 183. The blockchain configuration method of any of the above method clauses comprising:
obtaining from a party other than a first user (e.g. the one or more particular users) an identification of a first OCC module;
providing a manifestation of control of a first OCC module based on an action upon a first OCC module; and
allowing the party to access an other zero-knowledge proof signaling the manifestation of control of a first OCC module without disclosing who controls a first OCC module.

Clause 184. The blockchain configuration method of any of the above method clauses comprising:
allowing someone access to a first zero-knowledge proof 973 that confirms that a first OCP module 375A and a first OCC module 375B are commonly controlled while concealing who controls them.

Clause 185. The blockchain configuration method of any of the above method clauses wherein allowing one or more particular users 10 to contact the first user 10A-B anonymously (is included and) comprises:
allowing one or more particular users 10 to contact the first user 10A-B indirectly via a first (pseudonymous or other) anonymous communication protocol 105G while only allowing one or more particular users 10 to target any user 10A-B who controls a first OCC module 375B via a first pseudonymous communication protocol 105F.

Clause 186. The blockchain configuration method of any of the above method clauses wherein allowing one or more particular users 10 to contact the first user 10A-B via a first pseudonymous communication protocol 105F (is included and) comprises:

allowing one or more particular users 10 to contact the first user 10A-B indirectly via a first pseudonymous communication protocol 105F while only allowing one or more particular users 10 to target someone who controls a first OCC module 375B via a first pseudonymous communication protocol 105F and while preventing one or more particular users 10 from doxxing the first user 10A-B.

Clause 187. The blockchain configuration method of any of the above method clauses wherein converting a speculative first linkage into the confirmed first linkage 187E among a first user, a first OCP module 375A, and a first OCC module 375B (is included and) comprises:

obtaining a first digital contact mode 262 (e.g. a working email address 182) of the first user 10A-B that identifies a first user;

associating a first aliased contact mode 262 (e.g. a limited-purpose email distribution or other address 182 that preserves anonymity to protect its users) for the first user 10A-B that does not identify the first user 10A-B with (at least) a first OCC module 375B whereby a pseudonymous communication protocol 105F allows one or more particular users who refer to a first OCC module 375B to receive and use a first aliased contact mode 262 to contact (at least) the first user 10A-B without identifying any user that controls a first OCC module 375B and whereby a trustless pseudonymous interaction structure is implemented.

Clause 188. The blockchain configuration method of any of the above method clauses wherein at least one of a first and second user actions 253 are gleaned from an inchoate meta-transaction (e.g. as one or more transfer-indicative records 189 or other events 186) targeting a first OCP module and a first OCC module Clause 189. The blockchain configuration method of any of the above method clauses wherein converting a speculative first linkage into the confirmed first linkage among a first user, a first OCP module 375A, and a first OCC module 375B (is included and) comprises:

obtaining a first direct contact mode 262 of the first user 10A-B that identifies a first user;

associating a first aliased contact mode 262 for the first user 10A-B that does not identify the first user 10A-B with (at least) a first OCP module 375A whereby a pseudonymous communication protocol 105F allows one or more particular users who refer to a first OCP module 375A to receive and use a first aliased contact mode 262 to contact the first user 10A-B without identifying any user that controls a first OCP module 375A and whereby a trustless pseudonymous interaction structure is implemented.

Clause 190 The blockchain configuration method of any of the above method clauses wherein converting a speculative first linkage 187E into the confirmed first linkage 187E (is included and) comprises:

configuring a speculative first linkage 187E so as to extend also among the first user 10A-B and a first OCC module 375B when implementing a first zero-knowledge proof 973; and converting a speculative first linkage 187E into the confirmed first linkage 187E by obtaining (signed certificates from the first user 10A-B or other) token-holder-specific proof 973 that a first OCP module 375A and a first OCC module 375B are commonly controlled without indicating to one or more particular users 10 how to identify or contact the first user 10A-B.

Clause 191. The blockchain configuration method of any of the above method clauses comprising:

allowing a third user to access a first zero-knowledge proof (ZKP) whereby the third user does not (yet) obtain contact information about or other identification of the second user but wherein a first ZKP cryptographically signals at least a first element of first metadata 581 pertaining to the confirmed first linkage 187, 587 (e.g. comprising the confirmation of ownership); and responding to the second user selectively choosing the confirmed first linkage 187, 587 by enabling the second user to transmit a message (directly or otherwise) to the first user 10A-B via (at least one of) a first, second, or third token-associated module 375 without the second user (becoming or otherwise) being able to transmit any message via any of the fourth, fifth, or sixth token-associated modules 375.

Clause 192. The blockchain configuration method of any of the above method clauses comprising:

invoking transistor-based circuitry (e.g. an instance of interface logic 324) configured to allow one or more particular users 10 to contact the first user 10A-B via a first interaction protocol 105T that prevents one or more particular users 10 from identifying any user 10 that controls a first OCC module 375B.

Clause 193. The blockchain configuration method of any of the above method clauses wherein allowing one or more particular users 10 to contact the first user 10A-B via a first pseudonymous communication protocol 105F (is included and) comprises:

allowing one or more particular users 10 to contact the first user 10A-B indirectly via a first pseudonymous communication protocol 105F while only allowing one or more particular users 10 to target someone who controls a first OCC module 375B via a first pseudonymous communication protocol 105F and while preventing one or more particular users 10 from identifying the first user 10A-B.

Clause 194. The blockchain configuration method of any of the above method clauses wherein at least one of a first or second user actions 253 are gleaned from a multiple-transaction protocol 105K affecting (at least) a first OCP module and a first OCC module Clause 195. The blockchain configuration method of any of the above method clauses comprising:

obtaining first metadata 581 that defines a first (linkage-type-descriptive or other linkage-descriptive) parameter 167 of a speculative first linkage 187E;

obtaining second metadata 581 that defines a second parameter 167 of a speculative second linkage 187; and associating a first and second metadata 581 with a first annotation token 568 that resides in a first OCP module wherein a first OCP module 375A and a first OCC module 375B are commonly controlled insofar that a private key for each (e.g. as one or more respective security parameters 167) is held by a second user 10C.

Clause 196. The method of any of the above method clauses wherein a first OCP module 375A and a first OCC module 375B are both accessible by the first user 10A-B and wherein the second and third OCC modules 375D-E are both accessible by (at least) a second user 10C.

Clause 197. The method of any of the above method clauses comprising:
gleaning a first user action 253 from a first complex transaction or other on-chain event 186

Clause 198. The method of any of the above method clauses comprising:
gleaning a first or second user action 253 from an on-chain event 186

Clause 199. The method of any of the above method clauses comprising:
gleaning a first or second user action 253 (or both) from an on-chain event 186

Clause 200. The method of any of the above method clauses wherein allowing one or more information-seeking users 10C to contact the first user 10A-B via a first pseudonymous communication protocol 105F (is included and) comprises:
allowing the one or more information-seeking users 10C to contact the first user 10A-B indirectly via a first pseudonymous communication protocol 105F while only allowing the one or more information-seeking users 10C to target a user 10A-B who controls a first OCC module 375B via a first pseudonymous communication protocol 105F and while preserving anonymity of the first user 10A-B.

Clause 201. The method of any of the above method clauses wherein converting a speculative first linkage 187E into a confirmed first linkage 187E (is included and) comprises:
configuring the speculative first linkage 187E to extend (at least) among the first user 10A-B and a first OCP module 375A; and
converting the speculative first linkage 187E into the confirmed first linkage 187E by obtaining (signed certificates from the first user 10A-B or other) token-holder-specific proof 973 that a first OCP module 375A and a first OCC module 375B are commonly controlled without indicating to one or more particular users 10 how to identify or contact the first user 10A-B.

Clause 202. The method of any of the above method clauses wherein a first OCP module 375A and a first OCC module 375B are commonly controlled insofar that one or more public blockchains 985 has indicated that a (direct or other) token transfer between them has occurred.

Clause 203. The method of any of the above method clauses comprising:
allowing an other user 10 to receive one or more zero-knowledge proofs (ZKP) 973 that demonstrate control over a first, second, and third OCC modules 375 without revealing contact information about any user 10 who can control a first, second, and third OCC modules 375.

Clause 204. The method of any of the above method clauses wherein a first OCP module 375A is directly accessible by a first user 10A-B-B when a speculative first linkage 187E is converted into a confirmed first linkage 187E.

Clause 205. The method of any of the above method clauses wherein a first OCP module 375A is directly accessible by the first user 10A-B when a speculative first linkage 187E is converted into a confirmed first linkage 187E.

Clause 206. The method of any of the above method clauses comprising:
configuring first metadata 581 to include a confidence-indicative parameter 167 pertaining to the second linkage 187, 587; and
later or otherwise transmitting first metadata 581 to one or more particular users 10.

Clause 207. The method of any of the above method clauses comprising:
configuring first metadata 581 to include provenance data pertaining to the second linkage 187, 587; and
transmitting first metadata 581 to one or more particular users 10 before the one or more users 10 received a first zero-knowledge proof 973.

Clause 208. The method of any of the above method clauses comprising:
configuring the second metadata 581 to include a linkage-attribute-specific confidence score or other provenance data describing the second linkage 187, 587; and
transmitting first metadata 581 (with a first zero-knowledge proof 973 or otherwise) to one or more particular users 10.

Clause 209. The method of any of the above method clauses wherein a first OCP module 375A and a first OCC module 375B are "commonly controlled" insofar that a private key for each is held by a user group 463 that includes (at least) the first user 10A-B and a second user 10C.

Clause 210. The method of any of the above method clauses wherein a first OCP module 375A and a first OCC module 375B are "commonly controlled" insofar that a private key for each is held (at least) by a second user 10.

Clause 211. The method of any of the above method clauses comprising supporting an allow-list record 189 with event-specific or entity-specific description 163 in the first ESD data repository 588, 988; and
migrating at least some content from a first annotation token 568A of one or more annotation tokens 568 to a destination annotation token 568B of a second deployment 600.

Clause 212. The method of any of the above method clauses comprising:
an interstitial or other operation of obtaining first metadata 581 that defines a (linkage-type-descriptive or other) linkage-descriptive parameter 167 of a speculative first or second linkage 187; and
establishing or otherwise obtaining second metadata 581 that defines a linkage-descriptive parameter 167 of the speculative first or second linkage 187.

Clause 213. The method of any of the above method clauses comprising:
upgrading a speculative first linkage 187 (as association 487D) into a confirmed first linkage 187 among the first user 10A-B and a first OCP module 375A and a first OCC module 375B in response to (eliciting and obtaining a signed certificate or other) proof 973 that first and second on-chain modules 375 in on-chain metadata 581 are commonly controlled.

Clause 214. The method of any of the above method clauses wherein more than 100 bytes of task progress data 384, 584 is included in the ESD data 384, 584 and used in categorizing the first user 10A-B.

Clause 215. The method of any of the above method clauses wherein more than 100 bytes of on-chain personal data 384, 584 is included in the ESD data 384, 584 and used in individually categorizing the first user 10A-B.

Clause 216. The method of any of the above method clauses wherein more than 100 bytes of personal data 384, 584 from one or more fiat service providers is included in the ESD data 384, 584 and used in individually categorizing the first user 10A-B.

Clause 217. The method of any of the above method clauses wherein numerous bytes of personal data 384, 584 are included in the ESD data 384, 584 and used in individually categorizing the first user 10A-B.

Clause 218. The method of any of the above method clauses wherein personal data 384, 584 from more than one source is included in the ESD data 384, 584 and used in categorizing a set of users 10 that includes the first user 10A-B.

Clause 219. The method of any of the above method clauses wherein personal data 384, 584 from more than one source is included in the ESD data 384, 584 and used in categorizing numerous aggregated users 10 including the first user 10A-B.

Clause 220. The method of any of the above method clauses wherein a first OCP module 375A and a first OCC module 375B are both accessible by the first user 10A-B.

Clause 221. The method of any of the above method clauses wherein a first OCP module 375A and a first OCC module 375B are both accessible by the first user 10A-B and wherein the second and third OCC modules 375D-E are both accessible by (at least) a second user 10C.

Clause 222. The method of any of the above method clauses wherein a third user 10D can thereby make an informed choice to act upon (at least) the second and third OCC modules 375D-E rather than upon first and second on-chain modules 375A-B.

Clause 223. A locally performed method (e.g. in a single county or circular locality smaller than 10 kilometers in diameter) that remotely invokes a performance of (the method of) one of the of the above method clauses and locally receives a confirmation, output, or other (indication of a) result 288 thereof.

Clause 224. A context-responsive blockchain configuration system comprising:
the transistor-based circuitry of any one of the above method clauses.

Clause 225. A context-responsive blockchain configuration system comprising:
transistor-based circuitry (e.g. an instance of distillation and linking logic 321, 329) configured to obtain a speculative first linkage 187E among (at least) a first on-chain primary (OCP) module 375A and a first OCC module 375B partly based upon a first user action 253 pertaining to the first OCP module 375A and partly based upon a second user action 253 pertaining to (at least) the first OCC module 375B;
transistor-based circuitry (e.g. another instance of distillation and linking logic 321, 329) configured to obtain a speculative second linkage 187 among a second OCC module 375D with a first user 10A-B or with a third OCC module 375E (or among both);
transistor-based circuitry (e.g. an instance of implementation logic 322) configured to convert the speculative first linkage into a confirmed first linkage 187E linking the first user 10A-B with the first OCP module 375A or with the first OCC module 375B (or with both); and
transistor-based circuitry (e.g. an instance of distillation logic 329) to allow access by one or more other users to a first zero-knowledge proof 973 configured to protect the first user 10A-B (e.g. against doxxing or other unwanted disseminations).

Clause 226. A context-responsive blockchain configuration system comprising:
transistor-based circuitry (e.g. an instance of linking logic 321) configured to cause a first on-chain primary (OCP) module 375A at least partly controlled by a first authorized entity 110 to be associated with a first user 10A-B and with one or more (subordinate or other) connected modules 375 that are within or otherwise related to the first OCP module 375A, wherein the first OCP module 375A is (directly or otherwise) associated with event-sequence-descriptive (ESD) data 384, 584 and wherein the ESD data 384, 584 has a first scalar size-related attribute 175A;
transistor-based circuitry (e.g. an instance of control logic 328) configured to cause the ESD data 384, 584 and the first scalar size-related attribute 175A both to grow one or more times (see FIG. 1) as the first OCP module 375A records (descriptions 366 or other) indications of one or more additional events 186; and
transistor-based circuitry (e.g. an instance of recognition logic 322 and control logic 328 jointly) configured to respond to the first scalar size-related attribute 175A of the ESD data 384, 584 (crossing or otherwise) reaching an explicit or other first size threshold 171A by imposing or otherwise indicating an autonomy enhancement 183 (e.g. upon the first user 10A-B).

Clause 227. A context-responsive blockchain configuration system comprising:
transistor-based circuitry (e.g. an instance of linking or implementation logic 321, 323) configured to mint one or more annotation tokens 568 that establish a definite or other first metadata linkage 187A, 587A with a first event-sequence-descriptive (ESD) data repository 588 and in a first deployment 500 (at least partly) based upon a first action 253 taken by a first user 10A-B;
transistor-based circuitry (e.g. an instance of distillation and linking logic 321, 329) configured to obtain a speculative second metadata linkage 187, 587 with a second (instance of an) ESD data repository 588 based upon a second action 253 indicated in association 487 with the first user 10A-B and with the second ESD data repository 588; and
transistor-based circuitry (e.g. an instance of invocation or distillation logic 324, 329) configured to cause or otherwise allow access to a first zero-knowledge proof 973 (ZKP) describing or otherwise pertaining to the first or second action 253 (or both) partly based on the first metadata linkage with the first ESD data repository 588 and partly based on the speculative second metadata linkage with the second ESD data repository without the first ZKP 973 identifying the first user 10A-B.

Clause 228. A context-responsive blockchain configuration system comprising:
transistor-based circuitry (e.g. instance of distillation and linking logic 321, 329) configured to obtain a speculative metadata linkage 187, 587 with a corresponding ESD data repository 588, 988 (at least partly) based upon a first user action 253 indicated in association with a first user 10A-B and with the corresponding ESD data repository 588, 988; and
transistor-based circuitry (e.g. an instance of invocation or distillation logic 324, 329) configured to transmit or otherwise allow access to a first zero-knowledge proof 973 (ZKP) pertaining to the first user action 253 (at least partly) based on another metadata linkage 187, 587 without thereby identifying the first user 10A-B.

Clause 229. A context-responsive blockchain configuration system comprising:
transistor-based circuitry (e.g. an instance of a linking logic 321) configured to associate a first on-chain primary (OCP) module 375A with a first user 10A-B;
transistor-based circuitry (e.g. an instance of implementation logic 323) configured to mint one or more annotation tokens 568 that manifest a first metadata linkage 187A, 587A in a first deployment 500 and with one or more event-sequence-descriptive (ESD) data repositories 588, 988; and transistor-based circuitry (e.g. an instance of recognition logic 322 and an instance of implementation logic 323 jointly) configured to respond to (a symptomatic risk 583 or other recognizable manifestation 168 of) a first disruption 577 of the first metadata linkage 187A, 587A in the first deployment 500 on the first public blockchain 985 and with the one or more ESD data repositories 588, 988 by establishing a second metadata linkage 587B in a second deployment 600 on the first public blockchain 985 and with the one or more ESD data repositories 588, 988.

Clause 230. A context-responsive blockchain configuration system comprising:

transistor-based circuitry (e.g. an instance of a linking logic 321) configured to associate a first on-chain primary (OCP) module 375A with a first on-chain connected (OCC) module 375B that is directly or otherwise connected to the first OCP module 375A;

transistor-based circuitry (e.g. an instance of implementation logic 323) configured to mint one or more annotation tokens 568 that manifest a first metadata linkage 187A, 587A in a first deployment 500 and with one or more event-sequence-descriptive (ESD) data repositories 588, 988;

transistor-based circuitry (e.g. another instance of linking logic 321) configured to allow or otherwise cause the one or more annotation tokens 568 to be assigned to a first user 10A-B;

and transistor-based circuitry (e.g. an instance of recognition logic 322 and an instance of implementation logic 323 jointly) configured to respond to (a symptomatic risk 583 or other recognizable manifestation 168 of) a first disruption 577 of the first metadata linkage 187A, 587A in the first deployment 500 on the first public blockchain 985 and with the one or more ESD data repositories 588, 988 by establishing a second metadata linkage 587B in a second deployment 600 on the first public blockchain 985 and with the one or more ESD data repositories 588, 988.

Clause 231. A context-responsive blockchain configuration system comprising:

transistor-based circuitry (e.g. an instance of linking logic 321) configured to cause a first on-chain primary (OCP) module 375A at least partly controlled by a first authorized entity 110 to be associated with a first user 10A-B and with numerous OCC modules 375 that are associated with the first OCP module 375A;

transistor-based circuitry (e.g. an instance of distillation logic 329) configured to (replace, modify, or otherwise) cause a first user-descriptive filtering (UDF) protocol 105L partly based on one or more actions 253 by the first user 10A-B signaling an explicit or other opt-in monitoring decision 285 and partly based on one or more actions 253 by the first user 10A-B signaling an explicit or other opt-out monitoring decision 285; and transistor-based circuitry (e.g. an instance of implementation logic 323) configured to cause the first OCP module 375A to implement the UDF protocol 105L by configuring a metadata linkage 187, 587 among the first user 10A-B and one or more repositories 588, 988 (e.g. configured as a first profile of the first user 10A-B that contains one or more such decisions 285) so that event-sequence-descriptive (ESD) data 384, 584 partly based on the opt-in monitoring decision and partly based on the opt-out monitoring decision 285 is thereby aggregated in association (e.g. via one or more linkages 187, 587) with the first OCP module 375A.

232. The system of any of the above system clauses configured to include most or all numbered features of system 100 as shown in FIG. 1.

233. The system of any of the above system clauses configured to include most or all numbered features of system 200 as shown in FIG. 2.

234. The system of any of the above system clauses configured to include most or all numbered features of system 300 as shown in FIG. 3.

235. The computing system of any of the above system clauses wherein an instance of invocation and interface logic 324, 325 thereof (is included and) resides on a single integrated circuit chip.

236. The computing system of any of the above system clauses wherein an instance of invocation and interface logic 324, 325 thereof resides in a single apparatus 529.

237. The computing system of any of the above system clauses wherein an instance of invocation and interface logic 324, 325 thereof (is included and) resides in one or more cloud-resident servers 700.

238. The computing system of any of the above system clauses and configured to perform a method of any one of the above method clauses.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Terms like "responsive to," "related to," or other such transitive, relational, or other connections do not generally exclude such variants, unless context dictates otherwise. Furthermore each claim below is intended to be given its least-restrictive interpretation that is reasonable to one skilled in the art.

What is claimed is:

1. A context-responsive blockchain configuration method comprising:

invoking first transistor-based circuitry configured to associate a first on-chain primary (OCP) module with a first on-chain connected (OCC) module;

invoking second transistor-based circuitry configured to mint one or more annotation tokens that manifest a first metadata linkage in a first deployment on a first public blockchain and with one or more event-sequence-descriptive (ESD) data repositories;

invoking third transistor-based circuitry configured to respond to a first authorized entity by causing said one or more annotation tokens to be assigned to a first user;

invoking fourth transistor-based circuitry configured to respond to a first disruption of said first metadata linkage in said first deployment on said first public blockchain and with said one or more ESD data repositories by establishing a second metadata linkage in a second deployment on said first public blockchain and with said one or more ESD data repositories; and (1) giving said first authorized entity at least one privilege that said first user lacks so that said first authorized entity can directly replace said first metadata linkage among said first OCP module and said one or more ESD data repositories and so that said first user cannot directly replace said first metadata linkage or (2) obtaining a first manifestation of said first disruption comprising one or more user actions that explicitly indicate an activation of a special-purpose control that textually labels a user preference and enables a linkage restoration protocol when activated.

2. The blockchain configuration method of claim 1 wherein responding to said first disruption of said first metadata linkage in said first deployment on said first public blockchain and with said one or more ESD data repositories by establishing said second metadata linkage in said second deployment on said first public blockchain and with said one or more ESD data repositories comprises:
   migrating at least some content from said first annotation token of said one or more annotation tokens to a destination annotation token of said second deployment.

3. The blockchain configuration method of claim 1 wherein associating said first OCP module with said first OCC module comprises:
   configuring said first deployment to include at least a first one of said one or more annotation tokens in said first OCP module and manifesting said first metadata linkage.

4. The blockchain configuration method of claim 1 wherein said first metadata linkage is among said first OCP module and at least some of said one or more ESD data repositories and wherein responding to said first authorized entity comprises:
   assigning said first annotation token and numerous OCC modules including said first OCC module to said first user.

5. The blockchain configuration method of claim 1 comprising:
   said giving said first authorized entity said at least one privilege that said first user lacks so that said first authorized entity can directly replace said first metadata linkage among said first OCP module and said one or more ESD data repositories and so that said first user cannot directly replace said first metadata linkage.

6. The blockchain configuration method of claim 1 comprising:
   obtaining said first manifestation of said first disruption comprising said one or more user actions that explicitly indicate said activation of said special-purpose control that textually labels said user preference and enables said linkage restoration protocol when activated.

7. The blockchain configuration method of claim 1 wherein said first and second metadata linkages are token-related, said method comprising:
   minting said one or more annotation tokens so as to establish said first metadata linkage among said first OCP module, said first OCC module, and said one or more ESD data repositories.

8. The blockchain configuration method of claim 1 comprising:
   iteratively improving a first value that guides machine learning logic so as to allow training data pertaining to one or more prior disruptions to improve a security protocol; and
   thereafter using said improved security protocol.

9. The blockchain configuration method of claim 1 wherein said first authorized entity is selectively authorized in that at least a first annotation token of said one or more annotation tokens on said first public blockchain cannot be moved by said first user but can be moved by said authorized entity, said method comprising:
   implementing a security protocol by which said one or more annotation tokens are modified pursuant to adjusting a first risk.

10. The blockchain configuration method of claim 1 comprising:
    said giving said first authorized entity said at least one privilege that said first user lacks so that said first authorized entity can directly modify said first metadata linkage among said first OCP module and said one or more ESD data repositories and so that said first user cannot modify said first metadata linkage;
    causing said one or more annotation tokens to be assigned to said first user without authorizing said first user to re-establish or otherwise establish said first metadata linkage among said first OCP module and said one or more ESD data repositories; and
    allowing said first authorized entity to invoke a linkage restoration protocol by which a second metadata linkage among said first OCP module and one or more ESD data repositories is made functional as a component of resolving said first disruption.

11. The blockchain configuration method of claim 1 wherein responding to said first disruption of said first metadata linkage comprises:
    invoking a disruption response protocol that causes a first description of said first disruption to be obtained;
    invoking a data evaluation protocol that recognizes and signals an unsuitability of a first ESD data repository of said one or more ESD data repositories based on a size of a first description of said first disruption; and
    causing more than half of a byte count of said first description of said first disruption to be stored in one or more other ESD data repositories of said one or more ESD data repositories.

12. The blockchain configuration method of claim 1 comprising:
    modifying or inserting at least some off-chain data in said one or more ESD data repositories before said first user obtains any access to or influence over said one or more annotation tokens; and
    modifying or inserting at least some other off-chain data in said one or more ESD data repositories after said first user first obtains access to or influence over said one or more annotation tokens.

13. The blockchain configuration method of claim 1 wherein responding to said first disruption of said first metadata linkage comprises:
    responding to said first disruption comprising a newfound security risk associated with a first recorded event by inserting description of said newfound security risk into said one or more ESD data repositories and by inserting a disruption-type-indicative metadata flag that corresponds to said first description of said newfound security risk into said one or more annotation tokens.

14. The blockchain configuration method of claim 1 wherein responding to said first disruption of said first metadata linkage comprises:
    responding to said first disruption comprising a newfound security risk associated with a first recorded event by inserting a first description of said newfound security risk into at least one of said ESD data repositories and by inserting a disruption-type-indicative metadata flag that corresponds to said first description of said newfound security risk into said one or more annotation tokens.

15. The blockchain configuration method of claim 1 wherein responding to said first disruption of said first metadata linkage comprises:
  responding to a first apparent, confirmed, or other disruption comprising a newfound security risk associated with a first recorded event by inserting a first description of said newfound security risk into said one or more ESD data repositories and by inserting a description-location-indicative metadata flag that corresponds to said first description of said newfound security risk into said one or more annotation tokens.

16. The blockchain configuration method of claim 1 wherein responding to said first disruption of said first metadata linkage comprises:
  supporting one or more allow-list records with entity-specific description and with event-specific description;
  implementing a security protocol by which said one or more annotation tokens are modified so as to implement a particular entity having become a trusted entity and so as to adjust a first risk; and
  recording a first quantified exacerbated risk using at least one of said one or more annotation tokens pursuant to a security protocol.

17. A context-responsive blockchain configuration computer program product comprising:
  one or more tangible, nonvolatile storage media; and
  machine instructions borne on said one or more tangible, nonvolatile storage media which, when running on one or more computer systems, cause said one or more computer systems to perform a method comprising:
    invoking first transistor-based circuitry configured to associate a first on-chain Primary (OCP) module with a first on-chain connected (OCC) module;
    invoking second transistor-based circuitry configured to mint one or more annotation tokens that manifest a first metadata linkage in a first deployment on a first public blockchain and with one or more event-sequence-descriptive (ESD) data repositories;
    invoking third transistor-based circuitry configured to respond to a first authorized entity by causing said one or more annotation tokens to be assigned to a first user;
    invoking fourth transistor-based circuitry configured to respond to a first disruption of said first metadata linkage in said first deployment on said first public blockchain and with said one or more ESD data repositories by establishing a second metadata linkage in a second deployment on said first public blockchain and with said one or more ESD data repositories; and
    (1) giving said first authorized entity at least one privilege that said first user lacks so that said first authorized entity can directly replace said first metadata linkage among said first OCP module and said one or more ESD data repositories and so that said first user cannot directly replace said first metadata linkage or (2) obtaining a first manifestation of said first disruption comprising one or more user actions that explicitly indicate an activation of a special-purpose control that textually labels a user preference and enables a linkage restoration protocol when activated.

18. The context-responsive blockchain configuration computer program product of claim 17 wherein said method comprises:
  said giving said first authorized entity said at least one privilege that said first user lacks so that said first authorized entity can directly replace said first metadata linkage among said first OCP module and said one or more ESD data repositories and so that said first user cannot directly replace said first metadata linkage.

19. The context-responsive blockchain configuration computer program product of claim 17 wherein said method comprises:
  obtaining said first manifestation of said first disruption comprising said one or more user actions that explicitly indicate said activation of said special-purpose control that textually labels said user preference and enables said linkage restoration protocol when activated.

20. A context-responsive blockchain configuration system comprising:
  first transistor-based circuitry configured to associate a first on-chain primary (OCP) module with a first on-chain connected (OCC) module;
  second transistor-based circuitry configured to mint one or more annotation tokens that manifest a first metadata linkage in a first deployment on a first public blockchain and with one or more event-sequence-descriptive (ESD) data repositories;
  third transistor-based circuitry configured to respond to a first authorized entity by causing said one or more annotation tokens to be assigned to a first user;
  fourth transistor-based circuitry configured to respond to a first disruption of said first metadata linkage in said first deployment on said first public blockchain and with said one or more ESD data repositories by establishing a second metadata linkage in a second deployment on said first public blockchain and with said one or more ESD data repositories; and
  (1) transistor-based circuitry configured to give said first authorized entity at least one privilege that said first user lacks so that said first authorized entity can directly replace said first metadata linkage among said first OCP module and said one or more ESD data repositories and so that said first user cannot directly replace said first metadata linkage or (2) transistor-based circuitry configured to obtain a first manifestation of said first disruption comprising one or more user actions that explicitly indicate an activation of a special-purpose control that textually labels a user preference and enables a linkage restoration protocol when activated.

\* \* \* \* \*